United States Patent
Batra et al.

(10) Patent No.: US 8,045,632 B2
(45) Date of Patent: Oct. 25, 2011

(54) SYSTEMS AND METHODS FOR DUAL-CARRIER MODULATION ENCODING AND DECODING

(75) Inventors: Anuj Batra, Dallas, TX (US); Deric W. Waters, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 775 days.

(21) Appl. No.: 12/099,308

(22) Filed: Apr. 8, 2008

(65) Prior Publication Data

US 2008/0260004 A1    Oct. 23, 2008

Related U.S. Application Data

(60) Provisional application No. 60/912,487, filed on Apr. 18, 2007.

(51) Int. Cl.
*H04K 1/10* (2006.01)
*H04L 27/28* (2006.01)

(52) U.S. Cl. ........ 375/260; 375/262; 375/267; 375/299; 375/347; 375/261; 455/500; 455/101; 370/203; 370/208; 370/210

(58) Field of Classification Search .......... 375/260–262, 375/264, 267, 299, 300, 347, 341, 349, 346; 455/500, 101; 370/203, 208, 210
See application file for complete search history.

(56) References Cited

U.S. PATENT DOCUMENTS

| 5,313,279 | A  | 5/1994 | Wang et al. |
| 6,185,259 | B1 | 2/2001 | Dent |
| 7,173,990 | B2 | 2/2007 | Kim et al. |
| 2006/0188032 | A1 | 8/2006 | Kim et al. |
| 2008/0212694 | A1* | 9/2008 | Leach et al. ......... 375/260 |

OTHER PUBLICATIONS

ECMA International, "High Rate Ultra Wideband PHY and MAC Standard," Standard ECMA-368, 2nd Edition, Dec. 2007, pp. i, ii, iii, and 14-74. Found at: http://www.ecma-international.org/publications/standards/Ecma-368.htm.
ECMA International, "MAC-Phy Interface for ECMA-368," Standard ECMA-369, 2nd Edition, Dec. 2007, 63 pages. Found at: http://www.ecma-international.org/publicationsistandards/Ecma-369.htm.

* cited by examiner

*Primary Examiner* — Phuong Phu
(74) *Attorney, Agent, or Firm* — Steven A. Shaw; W. James Brady; Frederick Telecky, Jr.

(57) ABSTRACT

Systems and methods for dual-carrier modulation (DCM) encoding and decoding for communication systems. Some embodiments comprise a DCM encoder for applying a pre-transmission function to at least one 16-QAM input symbol and mapping resulting transformed symbols onto at least one larger constellation prior to transmission. Some embodiments joint decode, by a DCM decoder, a predetermined number of received data elements and compute a set of log-likelihood ratio (LLR) values for at least eight bits from a resulting at least one transformed symbol.

6 Claims, 27 Drawing Sheets

$$LLR(b_{4k}) = \frac{2}{\sigma^2}\max\left[\left\{\frac{-18\alpha_1 - 30\alpha_2}{\sqrt{170}} + \frac{-81|h_k|^2 - 225|h_k + p|^2}{170}\right\}, \left\{\frac{-22\alpha_1 - 14\alpha_2}{\sqrt{170}} + \frac{-121|h_k|^2 - 49|h_k + p|^2}{170}\right\}, \left\{\frac{-26\alpha_1 + 2\alpha_2}{\sqrt{170}} + \frac{-169|h_k|^2 - |h_k + p|^2}{170}\right\}, \left\{\frac{-30\alpha_1 + 18\alpha_2}{\sqrt{170}} + \frac{-225|h_k|^2 - 81|h_k + p|^2}{170}\right\}, \left\{\frac{-2\alpha_1 - 26\alpha_2}{\sqrt{170}} + \frac{-|h_k|^2 - 169|h_k + p|^2}{170}\right\}, \left\{\frac{-6\alpha_1 - 10\alpha_2}{\sqrt{170}} + \frac{-9|h_k|^2 - 25|h_k + p|^2}{170}\right\}, \left\{\frac{-10\alpha_1 + 6\alpha_2}{\sqrt{170}} + \frac{-25|h_k|^2 - 9|h_k + p|^2}{170}\right\}, \left\{\frac{-14\alpha_1 + 22\alpha_2}{\sqrt{170}} + \frac{-49|h_k|^2 - 121|h_k + p|^2}{170}\right\}\right]$$

$$-\frac{2}{\sigma^2}\max\left[\left\{\frac{14\alpha_1 - 22\alpha_2}{\sqrt{170}} + \frac{-49|h_k|^2 - 121|h_k + p|^2}{170}\right\}, \left\{\frac{10\alpha_1 - 6\alpha_2}{\sqrt{170}} + \frac{-25|h_k|^2 - 9|h_k + p|^2}{170}\right\}, \left\{\frac{6\alpha_1 + 10\alpha_2}{\sqrt{170}} + \frac{-9|h_k|^2 - 25|h_k + p|^2}{170}\right\}, \left\{\frac{2\alpha_1 + 26\alpha_2}{\sqrt{170}} + \frac{-|h_k|^2 - 169|h_k + p|^2}{170}\right\}, \left\{\frac{30\alpha_1 - 18\alpha_2}{\sqrt{170}} + \frac{-225|h_k|^2 - 81|h_k + p|^2}{170}\right\}, \left\{\frac{26\alpha_1 - 2\alpha_2}{\sqrt{170}} + \frac{-169|h_k|^2 - |h_k + p|^2}{170}\right\}, \left\{\frac{22\alpha_1 + 14\alpha_2}{\sqrt{170}} + \frac{-121|h_k|^2 - 49|h_k + p|^2}{170}\right\}, \left\{\frac{18\alpha_1 + 30\alpha_2}{\sqrt{170}} + \frac{-81|h_k|^2 - 225|h_k + p|^2}{170}\right\}\right]$$

FIG. 4A $$LLR(b_{4k+1}) = \frac{2}{\sigma^2} \max \left[ \begin{array}{c}
\left| \frac{-18\alpha_1 - 30\alpha_2 - 81|h_k|^2 - 225 h_k + p}{\sqrt{170}} \right|^2, \\
\left| \frac{-22\alpha_1 - 14\alpha_2 - 121|h_k|^2 - 49 h_k + p}{\sqrt{170}} \right|^2, \\
\left| \frac{-26\alpha_1 + 2\alpha_2 - 169|h_k|^2 - h_k + p}{\sqrt{170}} \right|^2, \\
\left| \frac{-30\alpha_1 + 18\alpha_2 - 225|h_k|^2 - 81 h_k + p}{\sqrt{170}} \right|^2, \\
\left| \frac{30\alpha_1 - 18\alpha_2 - 225|h_k|^2 - 81 h_k + p}{\sqrt{170}} \right|^2, \\
\left| \frac{26\alpha_1 - 2\alpha_2 - 169|h_k|^2 - h_k + p}{\sqrt{170}} \right|^2, \\
\left| \frac{22\alpha_1 + 14\alpha_2 - 121|h_k|^2 - 49 h_k + p}{\sqrt{170}} \right|^2, \\
\left| \frac{18\alpha_1 + 30\alpha_2 - 81|h_k|^2 - 225 h_k + p}{\sqrt{170}} \right|^2
\end{array} \right]$$

$$- \frac{2}{\sigma^2} \max \left[ \begin{array}{c}
\left| \frac{-2\alpha_1 - 26\alpha_2 - |h_k|^2 - 169 h_k + p}{\sqrt{170}} \right|^2, \\
\left| \frac{-6\alpha_1 - 10\alpha_2 - 9|h_k|^2 - 25 h_k + p}{\sqrt{170}} \right|^2, \\
\left| \frac{-10\alpha_1 + 6\alpha_2 - 25|h_k|^2 - 9 h_k + p}{\sqrt{170}} \right|^2, \\
\left| \frac{-14\alpha_1 + 22\alpha_2 - 49|h_k|^2 - 121 h_k + p}{\sqrt{170}} \right|^2, \\
\left| \frac{14\alpha_1 - 22\alpha_2 - 49|h_k|^2 - 121 h_k + p}{\sqrt{170}} \right|^2, \\
\left| \frac{10\alpha_1 - 6\alpha_2 - 25|h_k|^2 - 9 h_k + p}{\sqrt{170}} \right|^2, \\
\left| \frac{6\alpha_1 + 10\alpha_2 - 9|h_k|^2 - 25 h_k + p}{\sqrt{170}} \right|^2, \\
\left| \frac{2\alpha_1 + 26\alpha_2 - |h_k|^2 - 169 h_k + p}{\sqrt{170}} \right|^2
\end{array} \right]$$

FIG. 4B

$$LLR(b_{4(k+p)}) = \frac{2}{\sigma^2} \max \left[ \left(\frac{18\alpha_1 + 30\alpha_2}{\sqrt{170}} + \frac{-81|h_k|^2 - 225|h_{k+p}|^2}{170}\right), \left(\frac{2\alpha_1 + 26\alpha_2}{\sqrt{170}} + \frac{-|h_k|^2 - 169|h_{k+p}|^2}{170}\right), \left(\frac{-14\alpha_1 + 22\alpha_2}{\sqrt{170}} + \frac{-49|h_k|^2 - 121|h_{k+p}|^2}{170}\right), \left(\frac{-30\alpha_1 + 18\alpha_2}{\sqrt{170}} + \frac{-225|h_k|^2 - 81|h_{k+p}|^2}{170}\right), \left(\frac{22\alpha_1 + 14\alpha_2}{\sqrt{170}} + \frac{-121|h_k|^2 - 49|h_{k+p}|^2}{170}\right), \left(\frac{6\alpha_1 + 10\alpha_2}{\sqrt{170}} + \frac{-9|h_k|^2 - 25|h_{k+p}|^2}{170}\right), \left(\frac{-10\alpha_1 + 6\alpha_2}{\sqrt{170}} + \frac{-25|h_k|^2 - 9|h_{k+p}|^2}{170}\right), \left(\frac{-26\alpha_1 + 2\alpha_2}{\sqrt{170}} + \frac{-169|h_k|^2 - |h_{k+p}|^2}{170}\right) \right]$$

$$- \frac{2}{\sigma^2} \max \left[ \left(\frac{26\alpha_1 - 2\alpha_2}{\sqrt{170}} + \frac{-169|h_k|^2 - |h_{k+p}|^2}{170}\right), \left(\frac{10\alpha_1 - 6\alpha_2}{\sqrt{170}} + \frac{-25|h_k|^2 - 9|h_{k+p}|^2}{170}\right), \left(\frac{-6\alpha_1 - 10\alpha_2}{\sqrt{170}} + \frac{-9|h_k|^2 - 25|h_{k+p}|^2}{170}\right), \left(\frac{-22\alpha_1 - 14\alpha_2}{\sqrt{170}} + \frac{-121|h_k|^2 - 49|h_{k+p}|^2}{170}\right), \left(\frac{30\alpha_1 - 18\alpha_2}{\sqrt{170}} + \frac{-225|h_k|^2 - 81|h_{k+p}|^2}{170}\right), \left(\frac{14\alpha_1 - 22\alpha_2}{\sqrt{170}} + \frac{-49|h_k|^2 - 121|h_{k+p}|^2}{170}\right), \left(\frac{-2\alpha_1 - 26\alpha_2}{\sqrt{170}} + \frac{-|h_k|^2 - 169|h_{k+p}|^2}{170}\right), \left(\frac{-18\alpha_1 - 30\alpha_2}{\sqrt{170}} + \frac{-81|h_k|^2 - 225|h_{k+p}|^2}{170}\right) \right]$$

FIG. 4C $$LLR(b_{4(k+p)+1}) = \frac{\max}{\sigma^2}\left[\left(\frac{18\alpha_1 + 30\alpha_2}{\sqrt{170}} + \frac{-81|h_k|^2 - 225|h_{k+p}|^2}{170}\right)^2, \left(\frac{2\alpha_1 + 26\alpha_2}{\sqrt{170}} + \frac{-|h_k|^2 - 169|h_{k+p}|^2}{170}\right)^2, \left(\frac{-14\alpha_1 + 22\alpha_2}{\sqrt{170}} + \frac{-49|h_k|^2 - 121|h_{k+p}|^2}{170}\right)^2, \left(\frac{-30\alpha_1 + 18\alpha_2}{\sqrt{170}} + \frac{-225|h_k|^2 - 81|h_{k+p}|^2}{170}\right)^2, \left(\frac{30\alpha_1 - 18\alpha_2}{\sqrt{170}} + \frac{-225|h_k|^2 - 81|h_{k+p}|^2}{170}\right)^2, \left(\frac{14\alpha_1 - 22\alpha_2}{\sqrt{170}} + \frac{-49|h_k|^2 - 121|h_{k+p}|^2}{170}\right)^2, \left(\frac{-2\alpha_1 - 26\alpha_2}{\sqrt{170}} + \frac{-|h_k|^2 - 169|h_{k+p}|^2}{170}\right)^2, \left(\frac{-18\alpha_1 - 30\alpha_2}{\sqrt{170}} + \frac{-81|h_k|^2 - 225|h_{k+p}|^2}{170}\right)^2\right]$$

$$-\frac{\max}{\sigma^2}\left[\left(\frac{22\alpha_1 + 14\alpha_2}{\sqrt{170}} + \frac{-121|h_k|^2 - 49|h_{k+p}|^2}{170}\right)^2, \left(\frac{6\alpha_1 + 10\alpha_2}{\sqrt{170}} + \frac{-9|h_k|^2 - 25|h_{k+p}|^2}{170}\right)^2, \left(\frac{-10\alpha_1 + 6\alpha_2}{\sqrt{170}} + \frac{-25|h_k|^2 - 9|h_{k+p}|^2}{170}\right)^2, \left(\frac{-26\alpha_1 + 2\alpha_2}{\sqrt{170}} + \frac{-169|h_k|^2 - |h_{k+p}|^2}{170}\right)^2, \left(\frac{26\alpha_1 - 2\alpha_2}{\sqrt{170}} + \frac{-169|h_k|^2 - |h_{k+p}|^2}{170}\right)^2, \left(\frac{10\alpha_1 - 6\alpha_2}{\sqrt{170}} + \frac{-25|h_k|^2 - 9|h_{k+p}|^2}{170}\right)^2, \left(\frac{-6\alpha_1 - 10\alpha_2}{\sqrt{170}} + \frac{-9|h_k|^2 - 25|h_{k+p}|^2}{170}\right)^2, \left(\frac{-22\alpha_1 - 14\alpha_2}{\sqrt{170}} + \frac{-121|h_k|^2 - 49|h_{k+p}|^2}{170}\right)^2\right]$$

FIG. 4D $$LLR(b_{4k+2}) = \frac{2}{\sigma^2} \max \left[ \begin{array}{c} \left( \frac{-18\beta_1 - 30\beta_2 + -81|h_k|^2 - 225|h_k+p|^2}{\sqrt{170}} \right) \\ \left( \frac{-22\beta_1 - 14\beta_2 + -121|h_k|^2 - 49|h_k+p|^2}{\sqrt{170}} \right) \\ \left( \frac{-26\beta_1 + 2\beta_2 + -169|h_k|^2 - |h_k+p|^2}{\sqrt{170}} \right) \\ \left( \frac{-30\beta_1 + 18\beta_2 + -225|h_k|^2 - 81|h_k+p|^2}{\sqrt{170}} \right) \\ \left( \frac{-2\beta_1 - 26\beta_2 + -|h_k|^2 - 169|h_k+p|^2}{\sqrt{170}} \right) \\ \left( \frac{-6\beta_1 - 10\beta_2 + -9|h_k|^2 - 25|h_k+p|^2}{\sqrt{170}} \right) \\ \left( \frac{-10\beta_1 + 6\beta_2 + -25|h_k|^2 - 9|h_k+p|^2}{\sqrt{170}} \right) \\ \left( \frac{-14\beta_1 + 22\beta_2 + -49|h_k|^2 - 121|h_k+p|^2}{\sqrt{170}} \right) \end{array} \right] - \frac{2}{\sigma^2} \max \left[ \begin{array}{c} \left( \frac{14\beta_1 - 22\beta_2 + -49|h_k|^2 - 121|h_k+p|^2}{\sqrt{170}} \right) \\ \left( \frac{10\beta_1 - 6\beta_2 + -25|h_k|^2 - 9|h_k+p|^2}{\sqrt{170}} \right) \\ \left( \frac{6\beta_1 + 10\beta_2 + -9|h_k|^2 - 25|h_k+p|^2}{\sqrt{170}} \right) \\ \left( \frac{2\beta_1 + 26\beta_2 + -|h_k|^2 - 169|h_k+p|^2}{\sqrt{170}} \right) \\ \left( \frac{30\beta_1 - 18\beta_2 + -225|h_k|^2 - 81|h_k+p|^2}{\sqrt{170}} \right) \\ \left( \frac{26\beta_1 - 2\beta_2 + -169|h_k|^2 - |h_k+p|^2}{\sqrt{170}} \right) \\ \left( \frac{22\beta_1 + 14\beta_2 + -121|h_k|^2 - 49|h_k+p|^2}{\sqrt{170}} \right) \\ \left( \frac{18\beta_1 + 30\beta_2 + -81|h_k|^2 - 225|h_k+p|^2}{\sqrt{170}} \right) \end{array} \right]$$

FIG. 4E $$LLR(b_{4k+3}) = \frac{1}{\sigma^2} \max \begin{bmatrix} \left(\frac{-18\beta_1 - 30\beta_2}{\sqrt{170}} + \frac{-81|h_k|^2 - 225|h_k + p|^2}{170}\right)^2, \\ \left(\frac{-22\beta_1 - 14\beta_2}{\sqrt{170}} + \frac{-121 h_k^2 - 49|h_k + p|^2}{170}\right)^2, \\ \left(\frac{-26\beta_1 + 2\beta_2}{\sqrt{170}} + \frac{-169|h_k|^2 - |h_k + p|^2}{170}\right)^2, \\ \left(\frac{-30\beta_1 + 18\beta_2}{\sqrt{170}} + \frac{-225|h_k|^2 - 81|h_k + p|^2}{170}\right)^2, \\ \left(\frac{30\beta_1 - 18\beta_2}{\sqrt{170}} + \frac{-225 h_k^2 - 81|h_k + p|^2}{170}\right)^2, \\ \left(\frac{26\beta_1 - 2\beta_2}{\sqrt{170}} + \frac{-169 h_k^2 - |h_k + p|^2}{170}\right)^2, \\ \left(\frac{22\beta_1 + 14\beta_2}{\sqrt{170}} + \frac{-121|h_k|^2 - 49|h_k + p|^2}{170}\right)^2, \\ \left(\frac{18\beta_1 + 30\beta_2}{\sqrt{170}} + \frac{-81 h_k^2 - 225|h_k + p|^2}{170}\right)^2 \end{bmatrix}$$

$$- \frac{1}{\sigma^2} \max \begin{bmatrix} \left(\frac{-2\beta_1 - 26\beta_2}{\sqrt{170}} + \frac{-|h_k|^2 - 169|h_k + p|^2}{170}\right)^2, \\ \left(\frac{-6\beta_1 - 10\beta_2}{\sqrt{170}} + \frac{-9 h_k^2 - 25|h_k + p|^2}{170}\right)^2, \\ \left(\frac{-10\beta_1 + 6\beta_2}{\sqrt{170}} + \frac{-25 h_k^2 - 9|h_k + p|^2}{170}\right)^2, \\ \left(\frac{-14\beta_1 + 22\beta_2}{\sqrt{170}} + \frac{-49|h_k|^2 - 121|h_k + p|^2}{170}\right)^2, \\ \left(\frac{14\beta_1 - 22\beta_2}{\sqrt{170}} + \frac{-49 h_k^2 - 121|h_k + p|^2}{170}\right)^2, \\ \left(\frac{10\beta_1 - 6\beta_2}{\sqrt{170}} + \frac{-25|h_k|^2 - 9|h_k + p|^2}{170}\right)^2, \\ \left(\frac{6\beta_1 + 10\beta_2}{\sqrt{170}} + \frac{-9|h_k|^2 - 25|h_k + p|^2}{170}\right)^2, \\ \left(\frac{2\beta_1 + 26\beta_2}{\sqrt{170}} + \frac{- h_k^2 - 169|h_k + p|^2}{170}\right)^2 \end{bmatrix}$$

FIG. 4F $$LLR(b_{4(k+p)+2}) = \frac{2}{\sigma^2}\max\left[\left(\frac{26\beta_1-2\beta_2}{\sqrt{170}}+\frac{-169|h_k|^2-h_k+p}{170}\right)^2, \left(\frac{10\beta_1-6\beta_2}{\sqrt{170}}+\frac{-25h_k^2-9h_k+p}{170}\right)^2, \left(\frac{-6\beta_1-10\beta_2}{\sqrt{170}}+\frac{-9h_k^2-25h_k+p}{170}\right)^2, \left(\frac{-22\beta_1-14\beta_2}{\sqrt{170}}+\frac{-121|h_k|^2-49h_k+p}{170}\right)^2, \left(\frac{30\beta_1-18\beta_2}{\sqrt{170}}+\frac{-225h_k^2-81|h_k+p|^2}{170}\right), \left(\frac{14\beta_1-22\beta_2}{\sqrt{170}}+\frac{-49h_k^2-121|h_k+p|^2}{170}\right), \left(\frac{-2\beta_1-26\beta_2}{\sqrt{170}}+\frac{-|h_k|^2-169|h_k+p|^2}{170}\right), \left(\frac{-18\beta_1-30\beta_2}{\sqrt{170}}+\frac{-81|h_k|^2-225|h_k+p|^2}{170}\right)\right]$$

$$-\frac{2}{\sigma^2}\max\left[\left(\frac{18\beta_1+30\beta_2}{\sqrt{170}}+\frac{-81|h_k|^2-225|h_k+p|^2}{170}\right), \left(\frac{2\beta_1+26\beta_2}{\sqrt{170}}+\frac{-|h_k|^2-169|h_k+p|^2}{170}\right), \left(\frac{-14\beta_1+22\beta_2}{\sqrt{170}}+\frac{-49h_k^2-121|h_k+p|^2}{170}\right), \left(\frac{-30\beta_1+18\beta_2}{\sqrt{170}}+\frac{-225h_k^2-81|h_k+p|^2}{170}\right), \left(\frac{22\beta_1+14\beta_2}{\sqrt{170}}+\frac{-121|h_k|^2-49h_k+p}{170}\right)^2, \left(\frac{6\beta_1+10\beta_2}{\sqrt{170}}+\frac{-9h_k^2-25h_k+p}{170}\right)^2, \left(\frac{-10\beta_1+6\beta_2}{\sqrt{170}}+\frac{-25|h_k|^2-9h_k+p}{170}\right)^2, \left(\frac{-26\beta_1+2\beta_2}{\sqrt{170}}+\frac{-169|h_k|^2-h_k+p}{170}\right)^2\right]$$

FIG. 4G $$LLR(b_{4(k+p)+3}) = \frac{2}{\sigma^2}\max\left[\left(\frac{18\beta_1+30\beta_2+\frac{-81|h_k|^2-225|h_k+p|^2}{\sqrt{170}}}\right)^2, \left(\frac{2\beta_1+26\beta_2+\frac{-|h_k|^2-169|h_k+p|^2}{\sqrt{170}}}\right)^2, \left(\frac{-14\beta_1+22\beta_2+\frac{-49|h_k|^2-121|h_k+p|^2}{\sqrt{170}}}\right)^2, \left(\frac{-30\beta_1+18\beta_2+\frac{-225|h_k|^2-81|h_k+p|^2}{\sqrt{170}}}\right)^2, \left(\frac{30\beta_1-18\beta_2+\frac{-225|h_k|^2-81|h_k+p|^2}{\sqrt{170}}}\right)^2, \left(\frac{14\beta_1-22\beta_2+\frac{-49|h_k|^2-121|h_k+p|^2}{\sqrt{170}}}\right)^2, \left(\frac{-2\beta_1-26\beta_2+\frac{-|h_k|^2-169|h_k+p|^2}{\sqrt{170}}}\right)^2, \left(\frac{-18\beta_1-30\beta_2+\frac{-81|h_k|^2-225|h_k+p|^2}{\sqrt{170}}}\right)^2\right]$$

$$-\frac{2}{\sigma^2}\max\left[\left(\frac{22\beta_1+14\beta_2+\frac{-121|h_k|^2-49|h_k+p|^2}{\sqrt{170}}}\right)^2, \left(\frac{6\beta_1+10\beta_2+\frac{-9|h_k|^2-25|h_k+p|^2}{\sqrt{170}}}\right)^2, \left(\frac{-10\beta_1+6\beta_2+\frac{-25|h_k|^2-9|h_k+p|^2}{\sqrt{170}}}\right)^2, \left(\frac{-26\beta_1+2\beta_2+\frac{-169|h_k|^2-|h_k+p|^2}{\sqrt{170}}}\right)^2, \left(\frac{26\beta_1-2\beta_2+\frac{-169|h_k|^2-|h_k+p|^2}{\sqrt{170}}}\right)^2, \left(\frac{10\beta_1-6\beta_2+\frac{-25|h_k|^2-9|h_k+p|^2}{\sqrt{170}}}\right)^2, \left(\frac{-6\beta_1-10\beta_2+\frac{-9|h_k|^2-25|h_k+p|^2}{\sqrt{170}}}\right)^2, \left(\frac{-22\beta_1-14\beta_2+\frac{-121|h_k|^2-49|h_k+p|^2}{\sqrt{170}}}\right)^2\right]$$

FIG. 4H $$LLR\ (b_{4k}) = \max \begin{bmatrix} \left( \dfrac{-\dfrac{18\alpha_1}{\sigma_k^2/2} - \dfrac{30\alpha_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \\[2ex] \left( \dfrac{-\dfrac{22\alpha_1}{\sigma_k^2/2} - \dfrac{14\alpha_2}{\sigma_{k+p}^2/2}}{\sqrt{170}} + \dfrac{-\dfrac{121|h_k|^2}{\sigma_k^2/2} - \dfrac{49|h_{k+p}|^2}{\sigma_{k+p}^2/2}}{170} \right) \\[2ex] \left( \dfrac{-\dfrac{26\alpha_1}{\sigma_k^2/2} + \dfrac{2\alpha_2}{\sigma_{k+p}^2/2}}{\sqrt{170}} + \dfrac{-\dfrac{169|h_k|^2}{\sigma_k^2/2} - \dfrac{|h_{k+p}|^2}{\sigma_{k+p}^2/2}}{170} \right) \\[2ex] \left( \dfrac{-\dfrac{30\alpha_1}{\sigma_k^2/2} + \dfrac{18\alpha_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\[2ex] \left( \dfrac{-\dfrac{2\alpha_1}{\sigma_k^2/2} - \dfrac{26\alpha_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \\[2ex] \left( \dfrac{-\dfrac{6\alpha_1}{\sigma_k^2/2} - \dfrac{10\alpha_2}{\sigma_{k+p}^2/2}}{\sqrt{170}} + \dfrac{-\dfrac{9|h_k|^2}{\sigma_k^2/2} - \dfrac{25|h_{k+p}|^2}{\sigma_{k+p}^2/2}}{170} \right) \\[2ex] \left( \dfrac{-\dfrac{10\alpha_1}{\sigma_k^2/2} + \dfrac{6\alpha_2}{\sigma_{k+p}^2/2}}{\sqrt{170}} + \dfrac{-\dfrac{25|h_k|^2}{\sigma_k^2/2} - \dfrac{9|h_{k+p}|^2}{\sigma_{k+p}^2/2}}{170} \right) \\[2ex] \left( \dfrac{-\dfrac{14\alpha_1}{\sigma_k^2/2} + \dfrac{22\alpha_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \end{bmatrix}$$ TO FIG. 4I-2

FIG. 4I-1

FROM FIG. 4I-1 $-\max\left\{\begin{array}{l}\left(\dfrac{\dfrac{14\alpha_1}{\sigma_k^2/2}-\dfrac{22\alpha_2}{\sigma_{k+p}^2/2}}{\sqrt{170}}+\dfrac{-\dfrac{49|h_k|^2}{\sigma_k^2/2}-\dfrac{121|h_{k+p}|^2}{\sigma_{k+p}^2/2}}{170}\right)\\[2pt]\left(\dfrac{\dfrac{10\alpha_1}{\sigma_k^2/2}-\dfrac{6\alpha_2}{\sigma_{k+p}^2/2}}{\sqrt{170}}+\dfrac{-\dfrac{25|h_k|^2}{\sigma_k^2/2}-\dfrac{9|h_{k+p}|^2}{\sigma_{k+p}^2/2}}{170}\right)\\[2pt]\left(\dfrac{\dfrac{6\alpha_1}{\sigma_k^2/2}+\dfrac{10\alpha_2}{\sigma_{k+p}^2/2}}{\sqrt{170}}+\dfrac{-\dfrac{9|h_k|^2}{\sigma_k^2/2}-\dfrac{25|h_{k+p}|^2}{\sigma_{k+p}^2/2}}{170}\right)\\[2pt]\left(\dfrac{\dfrac{2\alpha_1}{\sigma_k^2/2}+\dfrac{26\alpha_2}{\sigma_{k+p}^2/2}}{\sqrt{170}}+\dfrac{-\dfrac{|h_k|^2}{\sigma_k^2/2}-\dfrac{169|h_{k+p}|^2}{\sigma_{k+p}^2/2}}{170}\right)\\[2pt]\left(\dfrac{\dfrac{30\alpha_1}{\sigma_k^2/2}-\dfrac{18\alpha_2}{\sigma_{k+p}^2/2}}{\sqrt{170}}+\dfrac{-\dfrac{225|h_k|^2}{\sigma_k^2/2}-\dfrac{81|h_{k+p}|^2}{\sigma_{k+p}^2/2}}{170}\right)\\[2pt]\left(\dfrac{\dfrac{26\alpha_1}{\sigma_k^2/2}-\dfrac{2\alpha_2}{\sigma_{k+p}^2/2}}{\sqrt{170}}+\dfrac{-\dfrac{169|h_k|^2}{\sigma_k^2/2}-\dfrac{|h_{k+p}|^2}{\sigma_{k+p}^2/2}}{170}\right)\\[2pt]\left(\dfrac{\dfrac{22\alpha_1}{\sigma_k^2/2}+\dfrac{14\alpha_2}{\sigma_{k+p}^2/2}}{\sqrt{170}}+\dfrac{-\dfrac{121|h_k|^2}{\sigma_k^2/2}-\dfrac{49|h_{k+p}|^2}{\sigma_{k+p}^2/2}}{170}\right)\\[2pt]\left(\dfrac{\dfrac{18\alpha_1}{\sigma_k^2/2}+\dfrac{30\alpha_2}{\sigma_{k+p}^2/2}}{\sqrt{170}}+\dfrac{-\dfrac{81|h_k|^2}{\sigma_k^2/2}-\dfrac{225|h_{k+p}|^2}{\sigma_{k+p}^2/2}}{170}\right)\end{array}\right\}$

FIG. 4I-2

$$LLR\ (b_{4k+1})=\max \begin{bmatrix} \left( \dfrac{-\dfrac{18\alpha_1}{\sigma_k^2/2} - \dfrac{30\alpha_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \\ \left( \dfrac{-\dfrac{22\alpha_1}{\sigma_k^2/2} - \dfrac{14\alpha_2}{\sigma_{k+p}^2/2}}{\sqrt{170}} + \dfrac{-\dfrac{121|h_k|^2}{\sigma_k^2/2} - \dfrac{49|h_{k+p}|^2}{\sigma_{k+p}^2/2}}{170} \right) \\ \left( \dfrac{-\dfrac{26\alpha_1}{\sigma_k^2/2} + \dfrac{2\alpha_2}{\sigma_{k+p}^2/2}}{\sqrt{170}} + \dfrac{-\dfrac{169|h_k|^2}{\sigma_k^2/2} - \dfrac{|h_{k+p}|^2}{\sigma_{k+p}^2/2}}{170} \right) \\ \left( \dfrac{-\dfrac{30\alpha_1}{\sigma_k^2/2} + \dfrac{18\alpha_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\ \left( \dfrac{\dfrac{30\alpha_1}{\sigma_k^2/2} - \dfrac{18\alpha_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\ \left( \dfrac{\dfrac{26\alpha_1}{\sigma_k^2/2} - \dfrac{2\alpha_2}{\sigma_{k+p}^2/2}}{\sqrt{170}} + \dfrac{-\dfrac{169|h_k|^2}{\sigma_k^2/2} - \dfrac{|h_{k+p}|^2}{\sigma_{k+p}^2/2}}{170} \right) \\ \left( \dfrac{\dfrac{22\alpha_1}{\sigma_k^2/2} + \dfrac{14\alpha_2}{\sigma_{k+p}^2/2}}{\sqrt{170}} + \dfrac{-\dfrac{121|h_k|^2}{\sigma_k^2/2} - \dfrac{49|h_{k+p}|^2}{\sigma_{k+p}^2/2}}{170} \right) \\ \left( \dfrac{\dfrac{18\alpha_1}{\sigma_k^2/2} + \dfrac{30\alpha_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \end{bmatrix}$$ TO FIG. 4J-2

FIG. 4J-1

FROM FIG. 4J-1 $-\max \begin{bmatrix} \left( \dfrac{-\dfrac{2\alpha_1}{\sigma_k^2/2} - \dfrac{26\alpha_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \\[2ex] \left( \dfrac{-\dfrac{6\alpha_1}{\sigma_k^2/2} - \dfrac{10\alpha_2}{\sigma_{k+p}^2/2}}{\sqrt{170}} + \dfrac{-\dfrac{9|h_k|^2}{\sigma_k^2/2} - \dfrac{25|h_{k+p}|^2}{\sigma_{k+p}^2/2}}{170} \right) \\[2ex] \left( \dfrac{-\dfrac{10\alpha_1}{\sigma_k^2/2} + \dfrac{6\alpha_2}{\sigma_{k+p}^2/2}}{\sqrt{170}} + \dfrac{-\dfrac{25|h_k|^2}{\sigma_k^2/2} - \dfrac{9|h_{k+p}|^2}{\sigma_{k+p}^2/2}}{170} \right) \\[2ex] \left( \dfrac{-\dfrac{14\alpha_1}{\sigma_k^2/2} + \dfrac{22\alpha_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \\[2ex] \left( \dfrac{\dfrac{14\alpha_1}{\sigma_k^2/2} - \dfrac{22\alpha_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \\[2ex] \left( \dfrac{\dfrac{10\alpha_1}{\sigma_k^2/2} - \dfrac{6\alpha_2}{\sigma_{k+p}^2/2}}{\sqrt{170}} + \dfrac{-\dfrac{25|h_k|^2}{\sigma_k^2/2} - \dfrac{9|h_{k+p}|^2}{\sigma_{k+p}^2/2}}{170} \right) \\[2ex] \left( \dfrac{\dfrac{6\alpha_1}{\sigma_k^2/2} + \dfrac{10\alpha_2}{\sigma_{k+p}^2/2}}{\sqrt{170}} + \dfrac{-\dfrac{9|h_k|^2}{\sigma_k^2/2} - \dfrac{25|h_{k+p}|^2}{\sigma_{k+p}^2/2}}{170} \right) \\[2ex] \left( \dfrac{\dfrac{2\alpha_1}{\sigma_k^2/2} + \dfrac{26\alpha_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \end{bmatrix}$

FIG. 4J-2

$$LLR\,(b_{4(k+p)}) = \max \begin{bmatrix} \left( \dfrac{\dfrac{18\alpha_1}{\sigma_k^2/2} + \dfrac{30\alpha_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \\[2ex] \left( \dfrac{\dfrac{2\alpha_1}{\sigma_k^2/2} + \dfrac{26\alpha_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \\[2ex] \left( \dfrac{-\dfrac{14\alpha_1}{\sigma_k^2/2} + \dfrac{22\alpha_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \\[2ex] \left( \dfrac{-\dfrac{30\alpha_1}{\sigma_k^2/2} + \dfrac{18\alpha_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\[2ex] \left( \dfrac{\dfrac{22\alpha_1}{\sigma_k^2/2} + \dfrac{14\alpha_2}{\sigma_{k+p}^2/2}}{\sqrt{170}} + \dfrac{-\dfrac{121|h_k|^2}{\sigma_k^2/2} - \dfrac{49|h_{k+p}|^2}{\sigma_{k+p}^2/2}}{170} \right) \\[2ex] \left( \dfrac{\dfrac{6\alpha_1}{\sigma_k^2/2} + \dfrac{10\alpha_2}{\sigma_{k+p}^2/2}}{\sqrt{170}} + \dfrac{-\dfrac{9|h_k|^2}{\sigma_k^2/2} - \dfrac{25|h_{k+p}|^2}{\sigma_{k+p}^2/2}}{170} \right) \\[2ex] \left( \dfrac{-\dfrac{10\alpha_1}{\sigma_k^2/2} + \dfrac{6\alpha_2}{\sigma_{k+p}^2/2}}{\sqrt{170}} + \dfrac{-\dfrac{25|h_k|^2}{\sigma_k^2/2} - \dfrac{9|h_{k+p}|^2}{\sigma_{k+p}^2/2}}{170} \right) \\[2ex] \left( \dfrac{-\dfrac{26\alpha_1}{\sigma_k^2/2} + \dfrac{2\alpha_2}{\sigma_{k+p}^2/2}}{\sqrt{170}} + \dfrac{-\dfrac{169|h_k|^2}{\sigma_k^2/2} - \dfrac{|h_{k+p}|^2}{\sigma_{k+p}^2/2}}{170} \right) \end{bmatrix}$$

FROM FIG. 4K-1 $\Bigg\{$ $-\max$ $\begin{bmatrix} \left( \dfrac{\dfrac{26\alpha_1}{\sigma_k^2/2} - \dfrac{2\alpha_2}{\sigma_{k+p}^2/2}}{\sqrt{170}} + \dfrac{\dfrac{169|h_k|^2}{\sigma_k^2/2} - \dfrac{|h_{k+p}|^2}{\sigma_{k+p}^2/2}}{170} \right) \\[2em] \left( \dfrac{\dfrac{10\alpha_1}{\sigma_k^2/2} - \dfrac{6\alpha_2}{\sigma_{k+p}^2/2}}{\sqrt{170}} + \dfrac{\dfrac{25|h_k|^2}{\sigma_k^2/2} - \dfrac{9|h_{k+p}|^2}{\sigma_{k+p}^2/2}}{170} \right) \\[2em] \left( -\dfrac{\dfrac{6\alpha_1}{\sigma_k^2/2} - \dfrac{10\alpha_2}{\sigma_{k+p}^2/2}}{\sqrt{170}} + \dfrac{\dfrac{9|h_k|^2}{\sigma_k^2/2} - \dfrac{25|h_{k+p}|^2}{\sigma_{k+p}^2/2}}{170} \right) \\[2em] \left( -\dfrac{\dfrac{22\alpha_1}{\sigma_k^2/2} - \dfrac{14\alpha_2}{\sigma_{k+p}^2/2}}{\sqrt{170}} + \dfrac{\dfrac{121|h_k|^2}{\sigma_k^2/2} - \dfrac{49|h_{k+p}|^2}{\sigma_{k+p}^2/2}}{170} \right) \\[2em] \left( \dfrac{\dfrac{30\alpha_1}{\sigma_k^2/2} - \dfrac{18\alpha_2}{\sigma_{k+p}^2/2}}{\sqrt{170}} + \dfrac{\dfrac{225|h_k|^2}{\sigma_k^2/2} - \dfrac{81|h_{k+p}|^2}{\sigma_{k+p}^2/2}}{170} \right) \\[2em] \left( \dfrac{\dfrac{14\alpha_1}{\sigma_k^2/2} - \dfrac{22\alpha_2}{\sigma_{k+p}^2/2}}{\sqrt{170}} + \dfrac{\dfrac{49|h_k|^2}{\sigma_k^2/2} - \dfrac{121|h_{k+p}|^2}{\sigma_{k+p}^2/2}}{170} \right) \\[2em] \left( -\dfrac{\dfrac{2\alpha_1}{\sigma_k^2/2} - \dfrac{26\alpha_2}{\sigma_{k+p}^2/2}}{\sqrt{170}} + \dfrac{\dfrac{|h_k|^2}{\sigma_k^2/2} - \dfrac{169|h_{k+p}|^2}{\sigma_{k+p}^2/2}}{170} \right) \\[2em] \left( -\dfrac{\dfrac{18\alpha_1}{\sigma_k^2/2} - \dfrac{30\alpha_2}{\sigma_{k+p}^2/2}}{\sqrt{170}} + \dfrac{\dfrac{81|h_k|^2}{\sigma_k^2/2} - \dfrac{225|h_{k+p}|^2}{\sigma_{k+p}^2/2}}{170} \right) \end{bmatrix}$

FIG. 4K-2

$$LLR\ (b_{4(k+p)+1}) = \max \left\{ \begin{array}{c} \left( \dfrac{\dfrac{18\alpha_1}{\sigma_k^2/2} + \dfrac{30\alpha_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \\[2em] \left( \dfrac{\dfrac{2\alpha_1}{\sigma_k^2/2} + \dfrac{26\alpha_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \\[2em] \left( \dfrac{-\dfrac{14\alpha_1}{\sigma_k^2/2} + \dfrac{22\alpha_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \\[2em] \left( \dfrac{-\dfrac{30\alpha_1}{\sigma_k^2/2} + \dfrac{18\alpha_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\[2em] \left( \dfrac{\dfrac{30\alpha_1}{\sigma_k^2/2} - \dfrac{18\alpha_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\[2em] \left( \dfrac{\dfrac{14\alpha_1}{\sigma_k^2/2} - \dfrac{22\alpha_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \\[2em] \left( \dfrac{-\dfrac{2\alpha_1}{\sigma_k^2/2} - \dfrac{26\alpha_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \\[2em] \left( \dfrac{-\dfrac{18\alpha_1}{\sigma_k^2/2} - \dfrac{30\alpha_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \end{array} \right\} \text{TO FIG. 4L-2}$$

FIG. 4L-1

FROM FIG. 4L-1 $-\max$ $$\begin{bmatrix} \left( \dfrac{\dfrac{22\alpha_1}{\sigma_k^2/2} + \dfrac{14\alpha_2}{\sigma_{k+p}^2/2}}{\sqrt{170}} + \dfrac{-\dfrac{121|h_k|^2}{\sigma_k^2/2} - \dfrac{49|h_{k+p}|^2}{\sigma_{k+p}^2/2}}{170} \right) \\ \left( \dfrac{\dfrac{6\alpha_1}{\sigma_k^2/2} + \dfrac{10\alpha_2}{\sigma_{k+p}^2/2}}{\sqrt{170}} + \dfrac{-\dfrac{9|h_k|^2}{\sigma_k^2/2} - \dfrac{25|h_{k+p}|^2}{\sigma_{k+p}^2/2}}{170} \right) \\ \left( \dfrac{-\dfrac{10\alpha_1}{\sigma_k^2/2} + \dfrac{6\alpha_2}{\sigma_{k+p}^2/2}}{\sqrt{170}} + \dfrac{-\dfrac{25|h_k|^2}{\sigma_k^2/2} - \dfrac{9|h_{k+p}|^2}{\sigma_{k+p}^2/2}}{170} \right) \\ \left( \dfrac{-\dfrac{26\alpha_1}{\sigma_k^2/2} + \dfrac{2\alpha_2}{\sigma_{k+p}^2/2}}{\sqrt{170}} + \dfrac{-\dfrac{169|h_k|^2}{\sigma_k^2/2} - \dfrac{|h_{k+p}|^2}{\sigma_{k+p}^2/2}}{170} \right) \\ \left( \dfrac{\dfrac{26\alpha_1}{\sigma_k^2/2} - \dfrac{2\alpha_2}{\sigma_{k+p}^2/2}}{\sqrt{170}} + \dfrac{-\dfrac{169|h_k|^2}{\sigma_k^2/2} - \dfrac{|h_{k+p}|^2}{\sigma_{k+p}^2/2}}{170} \right) \\ \left( \dfrac{\dfrac{10\alpha_1}{\sigma_k^2/2} - \dfrac{6\alpha_2}{\sigma_{k+p}^2/2}}{\sqrt{170}} + \dfrac{-\dfrac{25|h_k|^2}{\sigma_k^2/2} - \dfrac{9|h_{k+p}|^2}{\sigma_{k+p}^2/2}}{170} \right) \\ \left( \dfrac{-\dfrac{6\alpha_1}{\sigma_k^2/2} - \dfrac{10\alpha_2}{\sigma_{k+p}^2/2}}{\sqrt{170}} + \dfrac{-\dfrac{9|h_k|^2}{\sigma_k^2/2} - \dfrac{25|h_{k+p}|^2}{\sigma_{k+p}^2/2}}{170} \right) \\ \left( \dfrac{-\dfrac{22\alpha_1}{\sigma_k^2/2} - \dfrac{14\alpha_2}{\sigma_{k+p}^2/2}}{\sqrt{170}} + \dfrac{-\dfrac{121|h_k|^2}{\sigma_k^2/2} - \dfrac{49|h_{k+p}|^2}{\sigma_{k+p}^2/2}}{170} \right) \end{bmatrix}$$

FIG. 4L-2

$$LLR(b_{4k+2}) = \max \begin{bmatrix} \left( \dfrac{-\dfrac{18\beta_1}{\sigma_k^2/2} - \dfrac{30\beta_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \\[2ex] \left( \dfrac{-\dfrac{22\beta_1}{\sigma_k^2/2} - \dfrac{14\beta_2}{\sigma_{k+p}^2/2}}{\sqrt{170}} + \dfrac{-\dfrac{121|h_k|^2}{\sigma_k^2/2} - \dfrac{49|h_{k+p}|^2}{\sigma_{k+p}^2/2}}{170} \right) \\[2ex] \left( \dfrac{-\dfrac{26\beta_1}{\sigma_k^2/2} + \dfrac{2\beta_2}{\sigma_{k+p}^2/2}}{\sqrt{170}} + \dfrac{-\dfrac{169|h_k|^2}{\sigma_k^2/2} - \dfrac{|h_{k+p}|^2}{\sigma_{k+p}^2/2}}{170} \right) \\[2ex] \left( \dfrac{-\dfrac{30\beta_1}{\sigma_k^2/2} + \dfrac{18\beta_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\[2ex] \left( \dfrac{-\dfrac{2\beta_1}{\sigma_k^2/2} - \dfrac{26\beta_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \\[2ex] \left( \dfrac{-\dfrac{6\beta_1}{\sigma_k^2/2} - \dfrac{10\beta_2}{\sigma_{k+p}^2/2}}{\sqrt{170}} + \dfrac{-\dfrac{9|h_k|^2}{\sigma_k^2/2} - \dfrac{25|h_{k+p}|^2}{\sigma_{k+p}^2/2}}{170} \right) \\[2ex] \left( \dfrac{-\dfrac{10\beta_1}{\sigma_k^2/2} + \dfrac{6\beta_2}{\sigma_{k+p}^2/2}}{\sqrt{170}} + \dfrac{-\dfrac{25|h_k|^2}{\sigma_k^2/2} - \dfrac{9|h_{k+p}|^2}{\sigma_{k+p}^2/2}}{170} \right) \\[2ex] \left( \dfrac{-\dfrac{14\beta_1}{\sigma_k^2/2} + \dfrac{22\beta_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \end{bmatrix}$$

FROM FIG. 4M-1 $\Bigg\{$ $-\max$ $\Bigg[ \begin{array}{c} \left( \dfrac{\dfrac{14\beta_1}{\sigma_k^2/2} - \dfrac{22\beta_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \\[2em] \left( \dfrac{\dfrac{10\beta_2}{\sigma_k^2/2} - \dfrac{6\beta_1}{\sigma_{k+p}^2/2}}{\sqrt{170}} + \dfrac{-\dfrac{25|h_k|^2}{\sigma_k^2/2} - \dfrac{9|h_{k+p}|^2}{\sigma_{k+p}^2/2}}{170} \right) \\[2em] \left( \dfrac{\dfrac{6\beta_1}{\sigma_k^2/2} + \dfrac{10\beta_2}{\sigma_{k+p}^2/2}}{\sqrt{170}} + \dfrac{-\dfrac{9|h_k|^2}{\sigma_k^2/2} - \dfrac{25|h_{k+p}|^2}{\sigma_{k+p}^2/2}}{170} \right) \\[2em] \left( \dfrac{\dfrac{2\beta_1}{\sigma_k^2/2} + \dfrac{26\beta_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \\[2em] \left( \dfrac{\dfrac{30\beta_1}{\sigma_k^2/2} - \dfrac{18\beta_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\[2em] \left( \dfrac{\dfrac{26\beta_1}{\sigma_k^2/2} - \dfrac{2\beta_2}{\sigma_{k+p}^2/2}}{\sqrt{170}} + \dfrac{-\dfrac{169|h_k|^2}{\sigma_k^2/2} - \dfrac{|h_{k+p}|^2}{\sigma_{k+p}^2/2}}{170} \right) \\[2em] \left( \dfrac{\dfrac{22\beta_1}{\sigma_k^2/2} + \dfrac{14\beta_2}{\sigma_{k+p}^2/2}}{\sqrt{170}} + \dfrac{-\dfrac{121|h_k|^2}{\sigma_k^2/2} - \dfrac{49|h_{k+p}|^2}{\sigma_{k+p}^2/2}}{170} \right) \\[2em] \left( \dfrac{\dfrac{18\beta_1}{\sigma_k^2/2} + \dfrac{30\beta_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \end{array} \Bigg]$

FIG. 4M-2

$$LLR(b_{4k+3}) = \max \begin{bmatrix} \left( \dfrac{-\dfrac{18\beta_1}{\sigma_k^2/2} - \dfrac{30\beta_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \\[2ex] \left( \dfrac{-\dfrac{22\beta_1}{\sigma_k^2/2} - \dfrac{14\beta_2}{\sigma_{k+p}^2/2}}{\sqrt{170}} + \dfrac{-\dfrac{121|h_k|^2}{\sigma_k^2/2} - \dfrac{49|h_{k+p}|^2}{\sigma_{k+p}^2/2}}{170} \right) \\[2ex] \left( \dfrac{-\dfrac{26\beta_1}{\sigma_k^2/2} + \dfrac{2\beta_2}{\sigma_{k+p}^2/2}}{\sqrt{170}} + \dfrac{-\dfrac{169|h_k|^2}{\sigma_k^2/2} - \dfrac{|h_{k+p}|^2}{\sigma_{k+p}^2/2}}{170} \right) \\[2ex] \left( \dfrac{-\dfrac{30\beta_1}{\sigma_k^2/2} + \dfrac{18\beta_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\[2ex] \left( \dfrac{\dfrac{30\beta_1}{\sigma_k^2/2} - \dfrac{18\beta_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\[2ex] \left( \dfrac{\dfrac{26\beta_1}{\sigma_k^2/2} - \dfrac{2\beta_2}{\sigma_{k+p}^2/2}}{\sqrt{170}} + \dfrac{-\dfrac{169|h_k|^2}{\sigma_k^2/2} - \dfrac{|h_{k+p}|^2}{\sigma_{k+p}^2/2}}{170} \right) \\[2ex] \left( \dfrac{\dfrac{22\beta_1}{\sigma_k^2/2} + \dfrac{14\beta_2}{\sigma_{k+p}^2/2}}{\sqrt{170}} + \dfrac{-\dfrac{121|h_k|^2}{\sigma_k^2/2} - \dfrac{49|h_{k+p}|^2}{\sigma_{k+p}^2/2}}{170} \right) \\[2ex] \left( \dfrac{\dfrac{18\beta_1}{\sigma_k^2/2} + \dfrac{30\beta_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \end{bmatrix} \text{TO FIG. 4N-2}$$

FIG. 4N-1

FROM FIG. 4N-1 $-\max \left[ \begin{array}{c} \left( \dfrac{-\dfrac{2\beta_1}{\sigma_k^2/2} - \dfrac{26\beta_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \\ \left( \dfrac{-\dfrac{6\beta_1}{\sigma_k^2/2} - \dfrac{10\beta_2}{\sigma_{k+p}^2/2}}{\sqrt{170}} + \dfrac{-\dfrac{9|h_k|^2}{\sigma_k^2/2} - \dfrac{25|h_{k+p}|^2}{\sigma_{k+p}^2/2}}{170} \right) \\ \left( \dfrac{-\dfrac{10\beta_1}{\sigma_k^2/2} + \dfrac{6\beta_2}{\sigma_{k+p}^2/2}}{\sqrt{170}} + \dfrac{-\dfrac{25|h_k|^2}{\sigma_k^2/2} - \dfrac{9|h_{k+p}|^2}{\sigma_{k+p}^2/2}}{170} \right) \\ \left( \dfrac{-\dfrac{14\beta_1}{\sigma_k^2/2} + \dfrac{22\beta_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \\ \left( \dfrac{\dfrac{14\beta_1}{\sigma_k^2/2} - \dfrac{22\beta_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \\ \left( \dfrac{\dfrac{10\beta_1}{\sigma_k^2/2} - \dfrac{6\beta_2}{\sigma_{k+p}^2/2}}{\sqrt{170}} + \dfrac{-\dfrac{25|h_k|^2}{\sigma_k^2/2} - \dfrac{9|h_{k+p}|^2}{\sigma_{k+p}^2/2}}{170} \right) \\ \left( \dfrac{\dfrac{6\beta_1}{\sigma_k^2/2} + \dfrac{10\beta_2}{\sigma_{k+p}^2/2}}{\sqrt{170}} + \dfrac{-\dfrac{9|h_k|^2}{\sigma_k^2/2} - \dfrac{25|h_{k+p}|^2}{\sigma_{k+p}^2/2}}{170} \right) \\ \left( \dfrac{\dfrac{2\beta_1}{\sigma_k^2/2} + \dfrac{26\beta_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \end{array} \right]$

FIG. 4N-2

$$LLR\,(b_{4(k+p)+2})=max\left[\begin{array}{c}\left(\dfrac{\dfrac{18\beta_1}{\sigma_k^2/2}+\dfrac{30\beta_2}{\sigma_{k+p}^2/2}}{\sqrt{170}}+\dfrac{-\dfrac{81|h_k|^2}{\sigma_k^2/2}-\dfrac{225|h_{k+p}|^2}{\sigma_{k+p}^2/2}}{170}\right)\\[4pt]\left(\dfrac{\dfrac{2\beta_1}{\sigma_k^2/2}+\dfrac{26\beta_2}{\sigma_{k+p}^2/2}}{\sqrt{170}}+\dfrac{-\dfrac{|h_k|^2}{\sigma_k^2/2}-\dfrac{169|h_{k+p}|^2}{\sigma_{k+p}^2/2}}{170}\right)\\[4pt]\left(\dfrac{-\dfrac{14\beta_1}{\sigma_k^2/2}+\dfrac{22\beta_2}{\sigma_{k+p}^2/2}}{\sqrt{170}}+\dfrac{-\dfrac{49|h_k|^2}{\sigma_k^2/2}-\dfrac{121|h_{k+p}|^2}{\sigma_{k+p}^2/2}}{170}\right)\\[4pt]\left(\dfrac{-\dfrac{30\beta_1}{\sigma_k^2/2}+\dfrac{18\beta_2}{\sigma_{k+p}^2/2}}{\sqrt{170}}+\dfrac{-\dfrac{225|h_k|^2}{\sigma_k^2/2}-\dfrac{81|h_{k+p}|^2}{\sigma_{k+p}^2/2}}{170}\right)\\[4pt]\left(\dfrac{\dfrac{22\beta_1}{\sigma_k^2/2}+\dfrac{14\beta_2}{\sigma_{k+p}^2/2}}{\sqrt{170}}+\dfrac{-\dfrac{121|h_k|^2}{\sigma_k^2/2}-\dfrac{49|h_{k+p}|^2}{\sigma_{k+p}^2/2}}{170}\right)\\[4pt]\left(\dfrac{\dfrac{6\beta_1}{\sigma_k^2/2}+\dfrac{10\beta_2}{\sigma_{k+p}^2/2}}{\sqrt{170}}+\dfrac{-\dfrac{9|h_k|^2}{\sigma_k^2/2}-\dfrac{25|h_{k+p}|^2}{\sigma_{k+p}^2/2}}{170}\right)\\[4pt]\left(\dfrac{-\dfrac{10\beta_1}{\sigma_k^2/2}+\dfrac{6\beta_2}{\sigma_{k+p}^2/2}}{\sqrt{170}}+\dfrac{-\dfrac{25|h_k|^2}{\sigma_k^2/2}-\dfrac{9|h_{k+p}|^2}{\sigma_{k+p}^2/2}}{170}\right)\\[4pt]\left(\dfrac{-\dfrac{26\beta_1}{\sigma_k^2/2}+\dfrac{2\beta_2}{\sigma_{k+p}^2/2}}{\sqrt{170}}+\dfrac{-\dfrac{169|h_k|^2}{\sigma_k^2/2}-\dfrac{|h_{k+p}|^2}{\sigma_{k+p}^2/2}}{170}\right)\end{array}\right.$$

FROM FIG. 40-1 $\Biggl\{$ $-max$ $\left[\begin{array}{c} \left(\dfrac{\dfrac{26\beta_1}{\sigma_k^2/2} - \dfrac{2\beta_2}{\sigma_{k+p}^2/2}}{\sqrt{170}} + \dfrac{-\dfrac{169|h_k|^2}{\sigma_k^2/2} - \dfrac{|h_{k+p}|^2}{\sigma_{k+p}^2/2}}{170}\right) \\[2ex] \left(\dfrac{\dfrac{10\beta_1}{\sigma_k^2/2} - \dfrac{6\beta_2}{\sigma_{k+p}^2/2}}{\sqrt{170}} + \dfrac{-\dfrac{25|h_k|^2}{\sigma_k^2/2} - \dfrac{9|h_{k+p}|^2}{\sigma_{k+p}^2/2}}{170}\right) \\[2ex] \left(\dfrac{-\dfrac{6\beta_1}{\sigma_k^2/2} - \dfrac{10\beta_2}{\sigma_{k+p}^2/2}}{\sqrt{170}} + \dfrac{-\dfrac{9|h_k|^2}{\sigma_k^2/2} - \dfrac{25|h_{k+p}|^2}{\sigma_{k+p}^2/2}}{170}\right) \\[2ex] \left(\dfrac{-\dfrac{22\beta_1}{\sigma_k^2/2} - \dfrac{14\beta_2}{\sigma_{k+p}^2/2}}{\sqrt{170}} + \dfrac{-\dfrac{121|h_k|^2}{\sigma_k^2/2} - \dfrac{49|h_{k+p}|^2}{\sigma_{k+p}^2/2}}{170}\right) \\[2ex] \left(\dfrac{\dfrac{30\beta_1}{\sigma_k^2/2} - \dfrac{18\beta_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170}\right) \\[2ex] \left(\dfrac{\dfrac{14\beta_1}{\sigma_k^2/2} - \dfrac{22\beta_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170}\right) \\[2ex] \left(\dfrac{-\dfrac{2\beta_1}{\sigma_k^2/2} - \dfrac{26\beta_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170}\right) \\[2ex] \left(\dfrac{-\dfrac{18\beta_1}{\sigma_k^2/2} - \dfrac{30\beta_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170}\right) \end{array}\right]$

FIG. 4O-2

$$LLR\ (b_{4(k+p)+3}) = \max \begin{bmatrix} \left( \dfrac{\dfrac{18\beta_1}{\sigma_k^2/2} + \dfrac{30\beta_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \\[2mm] \left( \dfrac{\dfrac{2\beta_1}{\sigma_k^2/2} + \dfrac{26\beta_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \\[2mm] \left( \dfrac{-\dfrac{14\beta_1}{\sigma_k^2/2} + \dfrac{22\beta_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \\[2mm] \left( \dfrac{-\dfrac{30\beta_1}{\sigma_k^2/2} + \dfrac{18\beta_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\[2mm] \left( \dfrac{\dfrac{30\beta_1}{\sigma_k^2/2} - \dfrac{18\beta_2}{\sigma_{k+p}^2/2}}{\sqrt{170}} + \dfrac{-\dfrac{225|h_k|^2}{\sigma_k^2/2} - \dfrac{81|h_{k+p}|^2}{\sigma_{k+p}^2/2}}{170} \right) \\[2mm] \left( \dfrac{\dfrac{14\beta_1}{\sigma_k^2/2} - \dfrac{22\beta_2}{\sigma_{k+p}^2/2}}{\sqrt{170}} + \dfrac{-\dfrac{49|h_k|^2}{\sigma_k^2/2} - \dfrac{121|h_{k+p}|^2}{\sigma_{k+p}^2/2}}{170} \right) \\[2mm] \left( \dfrac{-\dfrac{2\beta_1}{\sigma_k^2/2} - \dfrac{26\beta_2}{\sigma_{k+p}^2/2}}{\sqrt{170}} + \dfrac{-\dfrac{|h_k|^2}{\sigma_k^2/2} - \dfrac{169|h_{k+p}|^2}{\sigma_{k+p}^2/2}}{170} \right) \\[2mm] \left( \dfrac{-\dfrac{18\beta_1}{\sigma_k^2/2} - \dfrac{30\beta_2}{\sigma_{k+p}^2/2}}{\sqrt{170}} + \dfrac{-\dfrac{81|h_k|^2}{\sigma_k^2/2} - \dfrac{225|h_{k+p}|^2}{\sigma_{k+p}^2/2}}{170} \right) \end{bmatrix} \Biggr\} \text{TO FIG. 4P-2}$$

FIG. 4P-1

FROM FIG. 4P-1 $\Biggl\{ -\max \Biggl[ $ $$\left\{ \frac{\dfrac{22\beta_1}{\sigma_k^2/2}+\dfrac{14\beta_2}{\sigma_{k+p}^2/2}}{\sqrt{170}} + \dfrac{-\dfrac{121|h_k|^2}{\sigma_k^2/2}-\dfrac{49|h_{k+p}|^2}{\sigma_{k+p}^2/2}}{170} \right\}$$

$$\left\{ \frac{\dfrac{6\beta_1}{\sigma_k^2/2}+\dfrac{10\beta_2}{\sigma_{k+p}^2/2}}{\sqrt{170}} + \dfrac{-\dfrac{9|h_k|^2}{\sigma_k^2/2}-\dfrac{25|h_{k+p}|^2}{\sigma_{k+p}^2/2}}{170} \right\}$$

$$\left\{ \frac{-\dfrac{10\beta_1}{\sigma_k^2/2}+\dfrac{6\beta_2}{\sigma_{k+p}^2/2}}{\sqrt{170}} + \dfrac{-\dfrac{25|h_k|^2}{\sigma_k^2/2}-\dfrac{9|h_{k+p}|^2}{\sigma_{k+p}^2/2}}{170} \right\}$$

$$\left\{ \frac{-\dfrac{26\beta_1}{\sigma_k^2/2}+\dfrac{2\beta_2}{\sigma_{k+p}^2/2}}{\sqrt{170}} + \dfrac{-\dfrac{169|h_k|^2}{\sigma_k^2/2}-\dfrac{|h_{k+p}|^2}{\sigma_{k+p}^2/2}}{170} \right\}$$

$$\left\{ \frac{\dfrac{26\beta_1}{\sigma_k^2/2}-\dfrac{2\beta_2}{\sigma_{k+p}^2/2}}{\sqrt{170}} + \dfrac{-\dfrac{169|h_k|^2}{\sigma_k^2/2}-\dfrac{|h_{k+p}|^2}{\sigma_{k+p}^2/2}}{170} \right\}$$

$$\left\{ \frac{\dfrac{10\beta_1}{\sigma_k^2/2}-\dfrac{6\beta_2}{\sigma_{k+p}^2/2}}{\sqrt{170}} + \dfrac{-\dfrac{25|h_k|^2}{\sigma_k^2/2}-\dfrac{9|h_{k+p}|^2}{\sigma_{k+p}^2/2}}{170} \right\}$$

$$\left\{ \frac{-\dfrac{6\beta_1}{\sigma_k^2/2}-\dfrac{10\beta_2}{\sigma_{k+p}^2/2}}{\sqrt{170}} + \dfrac{-\dfrac{9|h_k|^2}{\sigma_k^2/2}-\dfrac{25|h_{k+p}|^2}{\sigma_{k+p}^2/2}}{170} \right\}$$

$$\left\{ \frac{-\dfrac{22\beta_1}{\sigma_k^2/2}-\dfrac{14\beta_2}{\sigma_{k+p}^2/2}}{\sqrt{170}} + \dfrac{-\dfrac{121|h_k|^2}{\sigma_k^2/2}-\dfrac{49|h_{k+p}|^2}{\sigma_{k+p}^2/2}}{170} \right\}$$

FIG. 4P-2

SYSTEMS AND METHODS FOR DUAL-CARRIER MODULATION ENCODING AND DECODING

CROSS-REFERENCE TO RELATED APPLICATIONS

The present application claims priority to U.S. provisional patent application Ser. No. 60/912,487 for "Dual-Carrier Modulation (DCM) Encoder-Decoder for Higher Data Rate Modes of WiMedia PHY", hereby incorporated herein by reference.

BACKGROUND

As devices become increasingly mobile and interoperable, networks may be more than the customary established grouping of devices. Instead, or in some cases in addition, devices join and leave networks on an ad-hoc basis. Such devices may join an existing network, or may form a temporary network for a limited duration or for a limited purpose. An example of such networks might be a personal area network (PAN). A PAN is a network used for communication among computer devices (including mobile devices such as laptops, mobile telephones, game consoles, digital cameras, and personal digital assistants) which are proximately close to one person. Any of the devices may or may not belong to the person in question. The reach of a PAN is typically a few tens of meters. PANs can be used for communication among the personal devices themselves (ad-hoc communication), or for connecting to a higher level network and/or the Internet (infrastructure communication). Personal area networks may be wired, e.g., a universal serial bus (USB) and/or IEEE 1394 interface or wireless. The latter communicates via networking technologies consistent with the protocol standards propounded by the Infrared Data Association (IrDA), the Bluetooth Special Interest Group (Bluetooth), the WiMedia Alliance's ultra wideband (UWB), or the like.

Among recently emerging communication technologies— especially those needing high data transfer rates—various ultra-wideband (UWB) technologies are gaining support and acceptance. UWB technologies are utilized for wireless transmission of video, audio or other high bandwidth data between various devices. Generally, UWB is utilized for short-range radio communications—typically data relay between devices within approximately 10 meters—although longer-range applications may be developed. A conventional UWB transmitter generally operates over a very wide spectrum of frequencies, several GHz in bandwidth. UWB may be defined as radio technology that has either: 1) spectrum that occupies bandwidth greater than 20% of its center frequency; or, as is it is more commonly understood, 2) a bandwidth$\geq$500 MHz.

Next generation networks, such as those standardized by the WiMedia Alliance, Inc., increase the range, speed, and reliability of wireless data networks. One implementation of next generation networks utilizes ultra-wideband (UWB) wireless technology, specifically a MultiBand orthogonal frequency-division multiplexing (OFDM) physical layer (PHY) radio along with a sophisticated medium access control (MAC) layer that can deliver data rates up to 480 megabits per second (Mbps).

The WiMedia UWB common radio platform enables high-speed (up to 480 Mbps), low power consumption data transfers in a wireless personal area network (WPAN). The WiMedia UWB common radio platform incorporates MAC layer and PHY layer specifications based on MultiBand OFDM (MB-OFDM). WiMedia UWB is optimized for the personal computer (PC), consumer electronics (CE), mobile device and automotive market segments. ECMA-368 and ECMA-369 are international ISO-based specifications for the WiMedia UWB common radio platform. Additional information may be found in U.S. patent application Ser. No. 11/099,317, entitled "Versatile System for Dual Carrier Transformation in Orthogonal Frequency Division Multiplexing", and U.S. patent application Ser. No. 11/551,980, entitled "Dual-Carrier Modulation Decoder", which are incorporated herein by reference.

Increasing demand for more powerful and convenient data and information communication has resulted in a number of advancements, particularly in wireless communication technologies. Despite the advancements, however, significant improvement in data transfer rates is sought.

BRIEF DESCRIPTION OF THE DRAWINGS

For a detailed description of exemplary embodiments of the invention, reference will be made to the accompanying drawings in which:

FIG. 4A illustrates reduced complexity log-likelihood ratio (LLR) equation for LLR($b_{4k}$), according to embodiments;

FIG. 4B illustrates reduced complexity LLR equation for LLR($b_{4k+1}$), according to embodiments;

FIG. 4C illustrates reduced complexity LLR equation for LLR($b_{4(k+p)}$), according to embodiments;

FIG. 4D illustrates reduced complexity LLR equation for LLR($b_{4(k+p)+1}$), according to embodiments;

FIG. 4E illustrates reduced complexity LLR equation for LLR($b_{4k+2}$), according to embodiments;

FIG. 4F illustrates reduced complexity LLR equation for LLR($b_{4k+3}$), according to embodiments;

FIG. 4G illustrates reduced complexity LLR equation for LLR($b_{4(k+p)+2}$), according to embodiments;

FIG. 4H illustrates reduced complexity LLR equation for LLR($b_{4(k+p)+3}$), according to embodiments;

FIG. 4I illustrates reduced complexity LLR equation for LLR($b_{4k}$) when noise variance across tones is not uniform, according to embodiments;

FIG. 4J illustrates reduced complexity LLR equation for LLR($b_{4k+1}$) when noise variance across tones is not uniform, according to embodiments;

FIG. 4K illustrates reduced complexity LLR equation for LLR($b_{4(k+p)}$) when noise variance across tones is not uniform, according to embodiments;

FIG. 4L illustrates reduced complexity LLR equation for LLR($b_{4(k+p)+1}$), when noise variance across tones is not uniform, according to embodiments;

FIG. 4M illustrates reduced complexity LLR equation for LLR($b_{4k+2}$) when noise variance across tones is not uniform, according to embodiments;

FIG. 4N illustrates reduced complexity LLR equation for LLR($b_{4k+3}$) when noise variance across tones is not uniform, according to embodiments;

FIG. 4O illustrates reduced complexity LLR equation for LLR($b_{4(k+p)+2}$) when noise variance across tones is not uniform, according to embodiments;

FIG. 4P illustrates reduced complexity LLR equation for $LLR(b_{4(k+p)+3})$ when noise variance across tones is not uniform, according to embodiments;

NOTATION AND NOMENCLATURE

Figure 1:
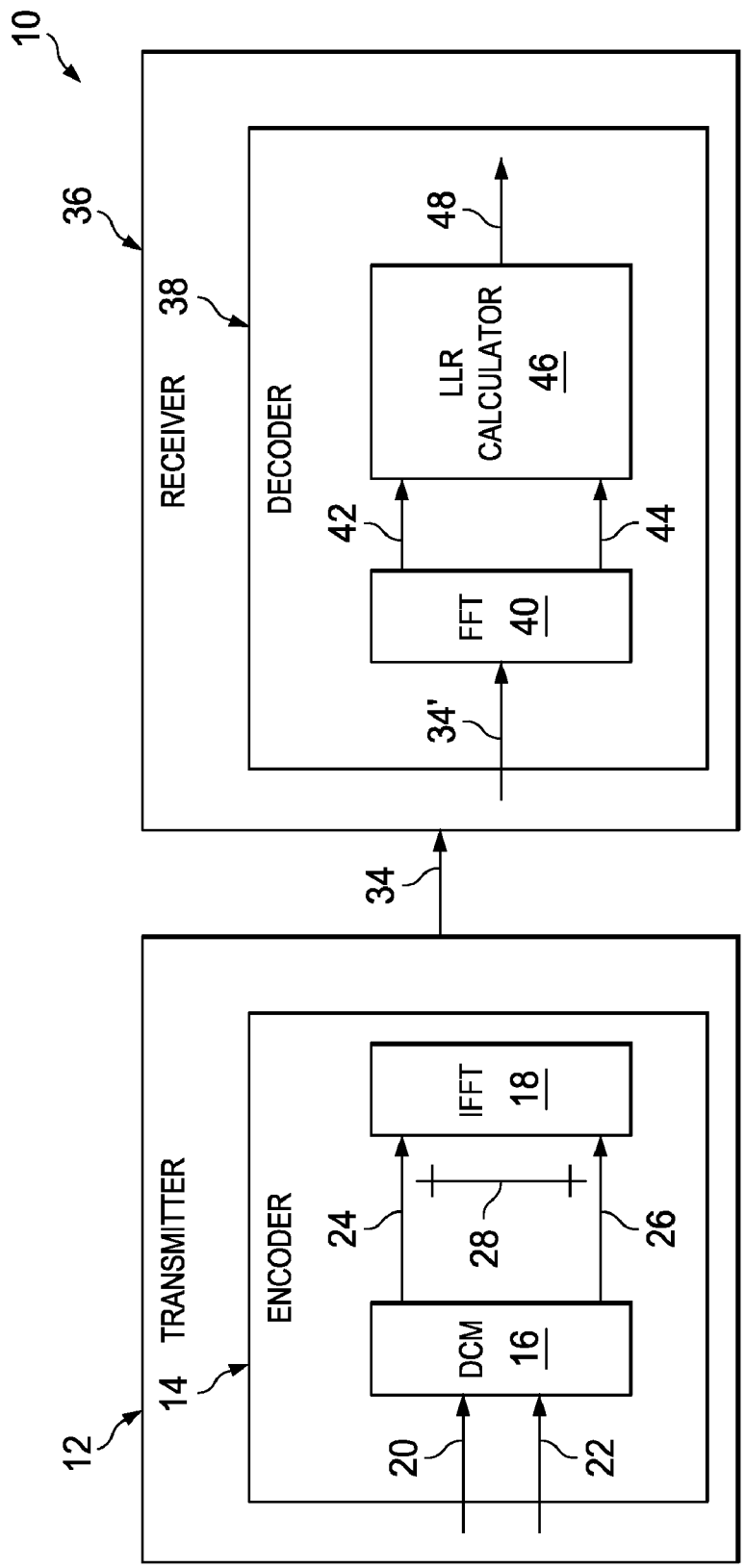
FIG. 1 is a block diagram of a DCM system, according to embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

It should be understood at the outset that although exemplary implementations of embodiments of the disclosure are illustrated below, embodiments may be implemented using any number of techniques, whether currently known or in existence. This disclosure should in no way be limited to the exemplary implementations, drawings, and techniques illustrated below, including the exemplary design and implementation illustrated and described herein, but may be modified within the scope of the appended claims along with their full scope of equivalents.

In light of the foregoing background, embodiments provide systems and methods for dual carrier modulation (DCM) to accommodate 16-QAM input constellations, which systems and methods are particularly useful for exploiting frequency diversity for data rates higher than 480 Mbps.

Although embodiments will be described for the sake of simplicity with respect to wireless communication systems, it should be appreciated that embodiments are not so limited, and can be employed in a variety of communication systems.

Despite the readily apparent advantages of using high data transfer rates, e.g., 640 Mbps, 800 Mbps, 960 Mbps, and above, no form of redundancy other than convolutional coding is used (neither frequency-domain spreading nor time-domain spreading), and therefore, prior to the present invention, there was no way to exploit the full frequency diversity of the channel in such a system. Of course, for data transfer rates at or below 480 Mbps, the WiMedia Alliance physical (PHY) layer version 1.0 (WiMedia Alliance/Multi-band OFDM Alliance Physical Layer Specification Version 1.x) uses dual-carrier modulation (DCM) to exploit frequency diversity at the cost of slightly increased complexity; see also for example, and without limitation, U.S. patent application Ser. No. 11/099,317 for "Versatile System for Dual Carrier Transformation in Orthogonal Frequency Divisional Multiplexing" and U.S. patent application Ser. No. 11/551,980, entitled "Dual-Carrier Modulation Decoder", hereby incorporated by reference herein.

One technique for increasing physical data rate is to use a 16-QAM constellation instead of quadrature phase-shift keying (QPSK); examples of such a technique may be found in U.S. patent application Ser. No. 11/115,816 for "Multi-band OFDM High Data Rate Extensions," hereby incorporated by reference herein. Table 1 summarizes potential data rates when using a 16-QAM constellation.

TABLE 1

PSDU rate-dependent parameters

| Data Rate (Mb/s) | Modulation | Coding Rate (R) | FDS | TDS | Coded Bits/6 OFDM symbols | Info Bits/6 OFDM symbols |
|---|---|---|---|---|---|---|
| 106.7 | 16-QAM | 1/3 | YES | YES | 600 | 200 |
| 160 | 16-QAM | 1/2 | YES | YES | 600 | 300 |
| 213.3 | 16-QAM | 1/3 | NO | YES | 1200 | 400 |
| 320 | 16-QAM | 1/2 | NO | YES | 1200 | 600 |
| 400 | 16-QAM | 5/8 | NO | YES | 1200 | 750 |
| 640 | 16-QAM | 1/2 | NO | NO | 2400 | 1200 |
| 800 | 16-QAM | 5/8 | NO | NO | 2400 | 1500 |
| 960 | 16-QAM | 3/4 | NO | NO | 2400 | 1800 |

Some of the present embodiments are hereafter illustratively described in conjunction with the design and operation of an ultra-wideband (UWB) communications system utilizing an Orthogonal Frequency Division Multiplexing (OFDM) scheme. Certain aspects of the present disclosure are further detailed in relation to design and operation of a MultiBand OFDM (MB-OFDM) UWB communications system. Although described in relation to such constructs and operations, the teachings and embodiments disclosed herein may be beneficially implemented with any data transmission or communication systems or protocols (e.g., IEEE 802.11(a) and IEEE 802.11(n)), depending upon the specific needs or requirements of such systems. ECMA International has published WiMedia Alliance standard ECMA-368 entitled, "High Rate Ultra Wideband PHY and MAC Standard", and ECMA-369 entitled, "MAC-PHY Interface for ECMA-368", which are hereby incorporated herein by reference as if reproduced in full, and which can be utilized in conjunction with the present embodiments.

Embodiments of OFDM-based wireless communication systems utilize a pre-transmission conversion function to convert a data signal from the frequency domain into the time domain for over-the-air transmission over a wireless channel. During transmission over the wireless channel, some degree of signal noise and possibly interference is added to the time domain data signal. As the time domain signal is received, a post-transmission conversion function is utilized to convert the signal back into the frequency domain, for subsequent signal processing or communication. Often, such pre-transmission and post-transmission conversion functions take the form of Inverse Fast Fourier Transforms (IFFTs) and Fast Fourier Transforms (FFTs), respectively.

Within the context of an OFDM-based UWB system, a pre-transmission IFFT commonly has 128 points (or tones) at the nominal baud rate. Depending upon the type of communications system, or specific design or performance requirements, however, an IFFT may have any desired or required number of tones. In some embodiments, one hundred of those tones are used as data carriers, twelve are pilot carriers (i.e., carry data known to receiver that it uses to ensure coherent detection), ten are guard carriers, and six are null tones. The ten guard carriers may be configured to serve a number of concurrent or independent functions. For example, some portion of the guard tones may be configured to improve signal-to-noise ratios (SNRs), by loading those guard carriers with critical data (e.g., unreliable data) for redundant transmission. Some portion of the guard tones may be configured (e.g., left unutilized) as frequency guard bands, to prevent interference to or from adjacent frequency bands; see also for example, and without limitation, U.S. patent application Ser. No. 11/021,053 for "Mapping Data Tones onto Guard Tones for a Multi-band OFDM system", hereby incorporated by reference herein. Of the six null tones, one typically occupies the middle of the available signal spectrum, and the others may be selectively configured or designated to conform to a desired spectral mask (e.g., UWB, 802.11, 802.16).

Within a MB-OFDM system, data tones may be loaded with quadrature amplitude modulation (QAM) data. For a high-throughput MB-OFDM system, there are a number of techniques that may be used to manipulate or tailor system data rates. In addition to code puncturing, techniques such as frequency domain spreading and time domain spreading may be employed to divide data transmission to a desired data rate. Frequency spreading and time spreading are two techniques which introduce redundancy into the transmission of data. However, as noted above, with emerging wireless technology, frequency spreading and time spreading are not available techniques at very high data rates, e.g., at or above 320 Mbps. By applying DCM to such systems, a different form of redundancy is included when frequency domain spreading or time domain spreading techniques are not available due to the high data rates. Unfortunately, known techniques for applying DCM to QPSK are not possible for data rates above 480 Mbps. Therefore, one of the innovative features of the present disclosure is the ability to compensate for the lack of frequency spreading or time spreading by providing embodiments which enable DCM to accommodate 16-QAM input constellations, which embodiments are particularly useful for exploiting frequency diversity for data rates higher than 480 Mbps.

The present disclosure, in some embodiments, provides embodiments for implementing a dual carrier modulation (DCM) encoder which concurrently maps eight separate input bits; four of which are mapped onto one 16-QAM constellation to form a tone set or symbol, while the remaining four of the eight input bits are mapped onto a second 16-QAM constellation to form a second tone set or symbol. Encoder embodiments group the two 16-QAM symbols into a vector and apply a conversion or transformation function to the vector to together produce two transformed symbols, the first of which is mapped onto a first 256-point constellation and the second of which is mapped onto a second 256-point constellation. It should be understood that the mapping used to create the first 256-point constellation and the second 256-point constellation may, in some embodiments, be dissimilar. This dissimilar arrangement is intended to refer to the placement of a symbol to a first location within the first 256-point constellation and the placement of the same symbol to a second location within the second 256-point constellation. Encoder embodiments map these transformed symbols onto two separate tones. The first tone and second tone are then transmitted with a predetermined frequency spacing inserted in between the transmission of the first tone and the second tone. One of the innovative features of transmitting a pair of symbols selected from two possibly different 256-point constellation pair is the ability at the receiver to maximize available information through the combination of the first symbols and the second symbols. In some situations, if a tone is lost or faded, then the symbol transmitted on that tone may be recovered by using information from the symbol transmitted on the other tone pair. By spreading the data over two tones with a large spacing between them, the probability that all elements of the tone pair will be degraded is greatly reduced. While embodiments discussed herein use a 256 point constellation, it is expressly understood that any number of points could be used to create a constellation. It is further expressly understood that while the same number of points are used in embodiments discussed herein, constellations containing a dissimilar number of points may be used consistent with the disclosed embodiments.

Another embodiment for implementing a dual carrier modulation (DCM) encoder is to map the eight input bits onto a first 256-point constellation directly to produce a first transformed symbol and map the same eight input bits onto a second 256-point constellation directly to produce a second transformed symbol.

The present disclosure, in some embodiments, provides systems and methods for implementing a dual carrier modulation (DCM) decoder with joint decoding. Joint decoding accepts a stream of data which has been separated into a first tone and a second tone distanced by some predetermined frequency spacing from the first tone. The first tone and second tone may be referred to collectively as a single tone pair. The phrase joint decoding (sometimes referred to herein as a joint decoder) is intended to refer to the apparatus, system or method by which a DCM decoder concurrently uses two separate tones to decode the tone pair and recover reliability information about the eight input bits. As noted above, if one of the bits within one of the tones is lost or degraded, it can be identified or recovered by embodiments of a DCM decoder.

Figure 2:
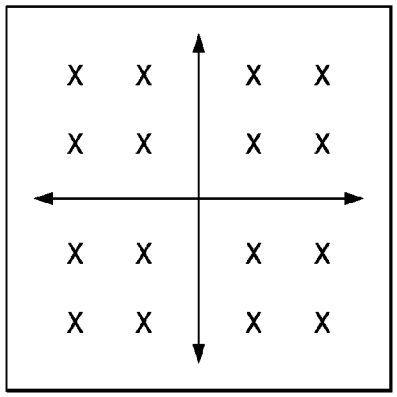
FIG. 2 illustrates a sixteen point constellation, which may be used to advantage by embodiments.

FIG. 1 is a block diagram 10 of a system using DCM 16. The communications system comprises transmitter 12 and receiver 36. Transmitter 12 comprises encoder 14, which in turn comprises DCM 16 and IFFT 18. Receiver 36 comprises decoder 38, which in turn comprises FFT 40 and LLR calculator 46. It should be appreciated that either or both transmitter 12 and receiver 36 may comprise additional functional blocks for further processing (e.g., noise variance estimation, channel estimation, FEC decoder, synchronization, scaling of channel outputs, etc.) The input to encoder 14 is a first symbol selected from a 16-QAM constellation 20 bearing data elements (e.g., 4 bits) and a second symbol selected from a 16-QAM constellation 22 bearing data elements (e.g., 4 more bits). An example of a 16-QAM constellation is illustrated in FIG. 2. Each 16-QAM constellation symbol represents four data elements. A data element may include, but is not limited to, a single bit of data. DCM 16 performs a transform on first symbol 20 together with second symbol 22 to create first transformed symbol 24 and second transformed symbol 26. Each of transformed symbols 24 and 26 bear the data from all eight data elements corresponding to symbols 20 and 22. An alternative description of exemplary embodiment of DCM 16 is to take the 4 bits corresponding to first symbol 20 and take the 4 bits corresponding to second symbol 22 and map the concatenated 8 bits onto a first 256-point constellation to produce first transformed symbol 24 and map the same concatenated 8 bits onto a second 256-point constellation to produce second transformed symbol 26.

Returning to FIG. 1, DCM 16 maps first transformed symbol 24 onto a first tone and second transformed symbol 26 onto a second tone. It is contemplated that a frequency spacing 28 may, in some embodiments, exist between the first tone 24 and second tone 26. In some embodiments, this spacing may be maximized in order to maximize the frequency diversity. The examples discussed herein use a fifty-tone spacing, however, it is expressly understood that any number of tone spacings could be used, and that more or less than a fifty tone spacing could be used consistent with this disclosure. First tone (or symbol) 24 and second tone (or symbol) 26 are passed into IFFT 18. IFFT 18 performs an inverse fast-Fourier transform to produce a time-domain signal 34. In some embodiments, signal 34 is further processed (shown for the sake of discussion as 34') before arriving at decoder 38. Signal 34 (or 34') is forwarded to FFT 40 where the signal is passed through a fast-Fourier transformation, resulting in recovery of third tone 42 which may be similar to first tone 24 and fourth tone 44 which may be similar to the second tone 26 from the signal. Decoder 38 groups tones 42 and 44 to pass to LLR calculator 46 so that these two tones (symbols) may be jointly decoded to produce reliability information. Here a log-likelihood ratio is performed jointly on the symbols 42 and 44 before the combined resulting set of LLRs is forwarded for further processing or analysis within receiver 36. More specifics with respect to encoding and decoding are provided below.

Focusing first on embodiments implementing DCM encoding, as noted above, dual-carrier modulation was added to the WiMedia physical layer version 1.0 specification in order to exploit channel diversity at the higher data rates with QPSK constellation inputs, where no additional forms of spreading other than possibly the convolutional code were available. However, embodiments of the present disclosure enable DCM to be extended to 16-QAM input constellations.

Figure 3:
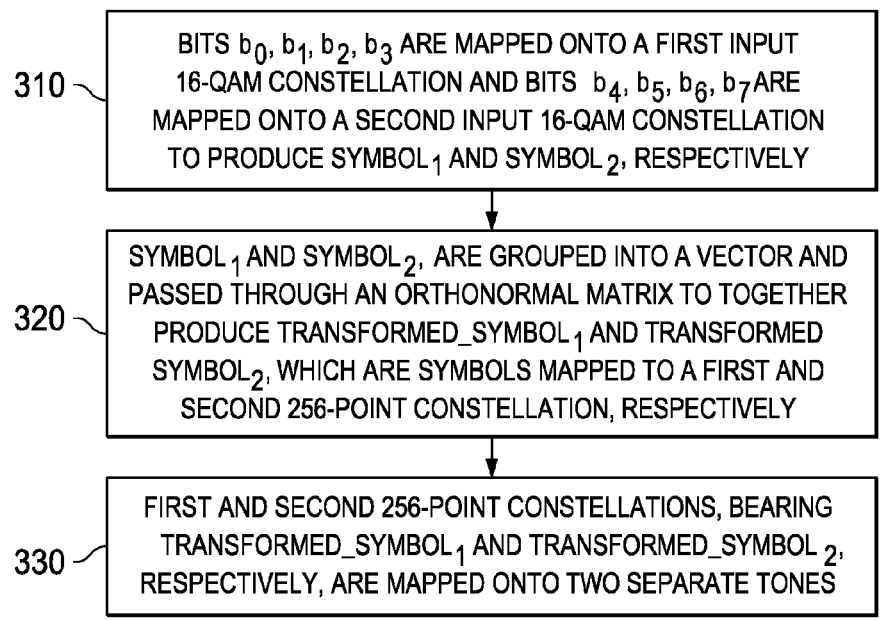
FIG. 3 illustrates an exemplary embodiment of encoding.

FIG. 3 is a flowchart of an exemplary embodiment of encoding. In this example embodiment, bits $b_0$, $b_1$, $b_2$, $b_3$ are mapped onto a first input 16-QAM constellation and bits $b_4$, $b_5$, $b_6$, $b_7$ are mapped onto a second input 16-QAM constellation to produce symbol$_1$ and symbol$_2$, respectively (block 310). Symbol$_1$ and symbol$_2$, are grouped into a vector and passed through an orthonormal matrix to together produce transformed_symbol$_1$ and transformed_symbol$_2$ which are symbols belonging to a first and a second 256-point constellation, respectively (block 320). Transformed_symbol$_1$ and transformed_symbol$_2$ are then mapped onto two separate tones (block 330). In some embodiments, the tones may be further processed prior to being transmitted.

The mapping between the normalized 16-QAM symbol on the $k^{th}$ tone, $s_k$, and the DCM symbol on the $k^{th}$ tone, $d_k$, is illustrated as equation (1):

$$D_k = TS_k \quad (1)$$

where $D_k = [d_k \ d_{k+p}]^T$, $S_k = [s_k \ s_{k+p}]^T$, p is a non-zero integer. For example, but not by way of limitation, the WiMedia physical layer version 1.0 specification uses a total of 100 data tones; therefore, to ensure maximum exploitation of the channel diversity a value of 50 is selected for p. It is expressly understood that if the number of data tones should change, the value of p should also be accordingly changed.

The mixing matrix from equation (1) is illustrated as equation (2):

$$T = \frac{1}{\sqrt{17}} \begin{bmatrix} 4 & 1 \\ 1 & -4 \end{bmatrix} \quad (2)$$

In at least one embodiment, each DCM symbol, $d_k$, is selected from a 256-point constellation using a unique mapping of the eight bits of information contained in $S_k$, where $T = T^T$. Note that other possible mixing matrices exist, which can be summarized by the following matrix illustrated as equation (2'):

$$T = \frac{1}{\sqrt{17}} \begin{bmatrix} \pm 4 & \pm 1 \\ \pm 1 & \pm 4 \end{bmatrix} \quad (2')$$

It should be appreciated that the signs, in at least some embodiments, are selected to ensure a one-to-one mapping between the two input 16-QAM constellations and the two 256-point constellations.

Consider now embodiments implementing DCM decoding. In an exemplary embodiment, the maximum-likelihood DCM decoder approach is used. In this embodiment, after FFT 40, the received signal 34' $r_k$ for the $k^{th}$ tone can be written as equation (3)

$$r_k = h_k d_k + n_k \quad (3)$$

where $h_k$ is the channel coefficient for the $k^{th}$ tone, and $n_k$ is a complex white Gaussian random variable with variance $E[n_k n_k^*] = \sigma_k^2$. It should be appreciated in the present discussion, that it is assumed that the noise variance is the same across the tones, i.e., $\sigma_k^2 = \sigma^2$ for all k.

The received vector $R_k = [r_k \ r_{k+p}]^T$, which represents the received signal 34', in at least some embodiments, for the $k^{th}$ and $(k+p)^{th}$ tones, can be written in matrix notation as shown in equation (4):

$$R_k = H_k D_k + N_k \quad (4)$$

where, in some embodiments, $N_k = [n_k \ n_{k+p}]^T$. One example of a representation for $H_k$ is:

$$H_k = \begin{bmatrix} h_k & 0 \\ 0 & h_{k+p} \end{bmatrix}. \quad (5)$$

The output used in this embodiment from the frequency-domain equalizer (FEQ), $Y_k$, can be written as:

$$Y_k = H^*_k R_k = |H_k|^2 D_k + H^*_k N_k = |H_k|^2 TS_k + H^*_k N_k \quad (6)$$

where, in at least one embodiment, $$|H_k|^2 = \begin{bmatrix} |h_k|^2 & 0 \\ 0 & |h_{k+p}|^2 \end{bmatrix}. \quad (7)$$

In some embodiments, the interleaved and coded bits [$b_{4k}$ $b_{4k+1}$ $b_{4k+2}$ $b_{4k+3}$],—where the subscript for the first bit is the value equal to four (4) times k, the subscript for the second bit is four (4) times k plus one (1), the subscript for the third bit is four (4) times k plus two (2), and the subscript for the fourth bit is four (4) times k plus three (3)—are mapped onto the normalized 16-QAM constellation symbol $s_k$ and $[b_{4(k+p)} \ b_{4(k+p)+1} \ b_{4(k+p)+2} \ b_{4(k+p)+3}]$—where the subscript for the first bit is the value equal to four (4) times (k+p), the subscript for the second bit is four (4) times (k+p) plus one (1), the subscript for the third bit is four (4) times (k+p) plus two (2), and the subscript for the fourth bit is four (4) times (k+p) plus three (3)—are mapped on to the normalized 16-QAM constellation symbol $s_{k+p}$. It is expressly understood that although the notation implies four consecutive bits are mapped onto the symbols, in actuality the four bits mapped onto each symbol can be selected or mapped in any order from the interleaved and coded bits, for example, and not by way of limitation, $[b_{4k} \ b_{4(k+p)+2} \ b_{4(k+p)} \ b_{4k-1}]$. Because, in some embodiments, the underlying 16-QAM constellation is Gray-coded and the mixing matrix T is real, the equation for $Y_k$ can be separated into its real and imaginary parts, and each portion can be independently optimized:

$$Re(Y_k) = |H_k|^2 T Re(S_k) + Re(H^*_k N_k) \quad (8)$$

$$Im(Y_k) = |H_k|^2 T Im(S_k) + Im(H^*_k N_k) \quad (9)$$

Note that this effectively subdivides MIMO detection with complex inputs into two separate MIMO detection portions with real inputs. It is expressly understood that whereas the complexity with complex inputs grows as $|A|^2$, where $|A|$ is the number of elements in the input constellation, the complexity with real inputs grows as $2|A|$.

Given the previous equations, the log-likelihood ratio (LLR) for $b_{4k}$, $b_{4k+1}$, $b_{4(k+p)}$, $b_{4(k+p)+1}$ (bits that map onto the real axis) and $b_{4k+2}$, $b_{4k+3}$, $b_{4(k+p)+2}$, $b_{4(k+p)+3}$ (bits that map onto the imaginary axis) can be determined. In some embodiments, the LLR is used to determine the probability that a single discrete point, bit or tone is accurately received.

The LLR for $b_{4k}$ is given by:

$$LLR(b_{4k}) = \log \left[ \frac{\sum_{b_{4k+1} b_{4(k+p)} b_{4(k+p)+1}} Pr(Y_k \mid b_{4k}=0, b_{4k+1}, b_{4(k+p)}, b_{4(k+p)+1})}{\sum_{b_{4k+1} b_{4(k+p)} b_{4(k+p)+1}} Pr(Y_k \mid b_{4k}=1, b_{4k+1}, b_{4(k+p)}, b_{4(k+p)+1})} \right] \quad (11)$$

$$= \log \left[ \frac{\sum_{b_{4k+1} b_{4(k+p)} b_{4(k+p)+1} \in \{0,1\}, b_{4k}=0} \exp\left[ -(\alpha_k - |H_k|^2 TS_R)^T \frac{2}{\sigma^2} |H_k|^{-2} (\alpha_k - |H_k|^2 TS_R) \right]}{\sum_{b_{4k+1} b_{4(k+p)} b_{4(k+p)+1} \in \{0,1\}, b_{4k}=1} \exp\left[ -(\alpha_k - |H_k|^2 TS_R)^T \frac{2}{\sigma^2} |H_k|^{-2} (\alpha_k - |H_k|^2 TS_R) \right]} \right]$$

where $\alpha_k = [\alpha_1 \ \alpha_2]^T = [Re(y_k) \ Re(y_{k-p})]^T$ and $S_R = Re(S_k)$. By expanding equation (11) and eliminating the terms that do not depend on $S_R$, the previous equation can be re-written as:

$$LLR(b_{4k}) = \log \left[ \frac{\sum_{b_{4k+1} b_{4(k+p)} b_{4(k+p)+1} \in \{0,1\}, b_{4k}=0} \exp\left[ \frac{2}{\sigma^2} S_R^T T(2\alpha_k - |H_k|^2 TS_R) \right]}{\sum_{b_{4k+1} b_{4(k+p)} b_{4(k+p)+1} \in \{0,1\}, b_{4k}=1} \exp\left[ \frac{2}{\sigma^2} S_R^T T(2\alpha_k - |H_k|^2 TS_R) \right]} \right] \quad (12)$$

Note that the summation over $b_{4k+1}$, $b_{4(k+p)}$, $b_{4(k+p)+1}$ with $b_{4k}=0$ implies using the following vectors for $S_R$ in the summation in equation (12):

$$S_R = \frac{1}{\sqrt{10}} \left\{ \begin{bmatrix} -3 \\ +3 \end{bmatrix}, \begin{bmatrix} -3 \\ +1 \end{bmatrix}, \begin{bmatrix} -3 \\ -1 \end{bmatrix}, \begin{bmatrix} -3 \\ -3 \end{bmatrix}, \begin{bmatrix} -1 \\ +3 \end{bmatrix}, \begin{bmatrix} -1 \\ +1 \end{bmatrix}, \begin{bmatrix} -1 \\ -1 \end{bmatrix}, \begin{bmatrix} -1 \\ -3 \end{bmatrix} \right\}.$$

Further, the summation over $b_{4k+1}$, $b_{4(k+p)}$, $b_{4(k+p)+1}$ with $b_{4k}=1$ implies using the following vectors for $S_R$ in the summation in equation (12):

$$S_R = \frac{1}{\sqrt{10}} \left\{ \begin{bmatrix} +1 \\ +3 \end{bmatrix}, \begin{bmatrix} +1 \\ +1 \end{bmatrix}, \begin{bmatrix} +1 \\ -1 \end{bmatrix}, \begin{bmatrix} +1 \\ -3 \end{bmatrix}, \begin{bmatrix} +3 \\ +3 \end{bmatrix}, \begin{bmatrix} +3 \\ +1 \end{bmatrix}, \begin{bmatrix} +3 \\ -1 \end{bmatrix}, \begin{bmatrix} +3 \\ -3 \end{bmatrix} \right\}.$$

Similarly, the LLR expression for $b_{4k+1}$ can be written as:

$$LLR(b_{4k+1}) = \log \left[ \frac{\sum_{b_{4k} b_{4(k+p)} b_{4(k+p)+1} \in \{0,1\}, b_{4k+1}=0} \exp\left[ \frac{2}{\sigma^2} S_R^T T(2\alpha_k - |H_k|^2 TS_R) \right]}{\sum_{b_{4k} b_{4(k+p)} b_{4(k+p)+1} \in \{0,1\}, b_{4k+1}=1} \exp\left[ \frac{2}{\sigma^2} S_R^T T(2\alpha_k - |H_k|^2 TS_R) \right]} \right] \quad (13)$$

Note that the summation over $b_{4k}$, $b_{4(k+p)}$, $b_{4(k+p)+1}$ with $b_{4k+1}=0$ implies using the following vectors for $S_R$ in the summation in equation (13):

$$S_R = \frac{1}{\sqrt{10}} \left\{ \begin{bmatrix} -3 \\ +3 \end{bmatrix}, \begin{bmatrix} -3 \\ +1 \end{bmatrix}, \begin{bmatrix} -3 \\ -1 \end{bmatrix}, \begin{bmatrix} -3 \\ -3 \end{bmatrix}, \begin{bmatrix} +3 \\ +3 \end{bmatrix}, \begin{bmatrix} +3 \\ +1 \end{bmatrix}, \begin{bmatrix} +3 \\ -1 \end{bmatrix}, \begin{bmatrix} +3 \\ -3 \end{bmatrix} \right\}.$$

Further, the summation over $b_{4k}$, $b_{4(k+p)}$, $b_{4(k+p)+1}$ with $b_{4k+1}=1$ implies using the following vectors for $S_R$ in the summation in equation (13):

$$S_R = \frac{1}{\sqrt{10}} \left\{ \begin{bmatrix} -1 \\ +3 \end{bmatrix}, \begin{bmatrix} -1 \\ +1 \end{bmatrix}, \begin{bmatrix} -1 \\ -1 \end{bmatrix}, \begin{bmatrix} -1 \\ -3 \end{bmatrix}, \begin{bmatrix} +1 \\ +3 \end{bmatrix}, \begin{bmatrix} +1 \\ +1 \end{bmatrix}, \begin{bmatrix} +1 \\ -1 \end{bmatrix}, \begin{bmatrix} +1 \\ -3 \end{bmatrix} \right\}.$$

Similarly, the LLR expression for $b_{4(k+p)}$ can be written as:

$$LLR(b_{4(k+p)}) = \log \left[ \frac{\sum_{b_{4k},b_{4k+1},b_{4(k+p)+1} \in \{0,1\}, b_{4(k+p)}=0} \exp\left[\frac{2}{\sigma^2} S_R^T T(2\alpha_k - |H_k|^2 T S_R)\right]}{\sum_{b_{4k},b_{4k+1},b_{4(k+p)+1} \in \{0,1\}, b_{4(k+p)}=1} \exp\left[\frac{2}{\sigma^2} S_R^T T(2\alpha_k - |H_k|^2 T S_R)\right]} \right] \quad (14)$$

Note that the summation over $b_{4k}$, $b_{4k+1}$, $b_{4(k+p)+1}$ with $b_{4(k+p)}=0$ implies using the following vectors for $S_R$ in the summation in equation (14):

$$S_R = \frac{1}{\sqrt{10}} \left\{ \begin{bmatrix} +3 \\ -3 \end{bmatrix}, \begin{bmatrix} +1 \\ -3 \end{bmatrix}, \begin{bmatrix} -1 \\ -3 \end{bmatrix}, \begin{bmatrix} -3 \\ -3 \end{bmatrix}, \begin{bmatrix} +3 \\ -1 \end{bmatrix}, \begin{bmatrix} +1 \\ -1 \end{bmatrix}, \begin{bmatrix} -1 \\ -1 \end{bmatrix}, \begin{bmatrix} -3 \\ -1 \end{bmatrix} \right\}.$$

Further, the summation over $b_{4k}$, $b_{4k+1}$, $b_{4(k+p)+1}$ with $b_{4(k+p)}=1$ implies using the following vectors for $S_R$ in the summation in equation (14):

$$S_R = \frac{1}{\sqrt{10}} \left\{ \begin{bmatrix} +3 \\ +1 \end{bmatrix}, \begin{bmatrix} +1 \\ +1 \end{bmatrix}, \begin{bmatrix} -1 \\ +1 \end{bmatrix}, \begin{bmatrix} -3 \\ +1 \end{bmatrix}, \begin{bmatrix} +3 \\ +3 \end{bmatrix}, \begin{bmatrix} +1 \\ +3 \end{bmatrix}, \begin{bmatrix} -1 \\ +3 \end{bmatrix}, \begin{bmatrix} -3 \\ +3 \end{bmatrix} \right\}.$$

Similarly, the LLR expression for $b_{4(k+p)+1}$ can be written as:

$$LLR(b_{4(k+p)+1}) = \log \left[ \frac{\sum_{b_{4k},b_{4k+1},b_{4(k+p)} \in \{0,1\}, b_{4(k+p)+1}=0} \exp\left[\frac{2}{\sigma^2} S_R^T T(2\alpha_k - |H_k|^2 T S_R)\right]}{\sum_{b_{4k},b_{4k+1},b_{4(k+p)} \in \{0,1\}, b_{4(k+p)+1}=1} \exp\left[\frac{2}{\sigma^2} S_R^T T(2\alpha_k - |H_k|^2 T S_R)\right]} \right] \quad (15)$$

Note that the summation over $b_{4k}$, $b_{4k+1}$, $b_{4(k+p)}$ with $b_{4(k+p)+1}=0$ implies using the following vectors for $S_R$ in the summation in equation (15):

$$S_R = \frac{1}{\sqrt{10}} \left\{ \begin{bmatrix} +3 \\ -3 \end{bmatrix}, \begin{bmatrix} +1 \\ -3 \end{bmatrix}, \begin{bmatrix} -1 \\ -3 \end{bmatrix}, \begin{bmatrix} -3 \\ -3 \end{bmatrix}, \begin{bmatrix} +3 \\ +3 \end{bmatrix}, \begin{bmatrix} +1 \\ +3 \end{bmatrix}, \begin{bmatrix} -1 \\ +3 \end{bmatrix}, \begin{bmatrix} -3 \\ +3 \end{bmatrix} \right\}.$$

Further, the summation over $b_{4k}$, $b_{4k+1}$, $b_{4(k+p)}$ with $b_{4(k+p)+1}=1$ implies using the following vectors for $S_R$ in the summation in equation (15):

$$S_R = \frac{1}{\sqrt{10}} \left\{ \begin{bmatrix} +3 \\ -1 \end{bmatrix}, \begin{bmatrix} +1 \\ -1 \end{bmatrix}, \begin{bmatrix} -1 \\ -1 \end{bmatrix}, \begin{bmatrix} -3 \\ -1 \end{bmatrix}, \begin{bmatrix} +3 \\ +1 \end{bmatrix}, \begin{bmatrix} +1 \\ +1 \end{bmatrix}, \begin{bmatrix} -1 \\ +1 \end{bmatrix}, \begin{bmatrix} -3 \\ +1 \end{bmatrix} \right\}.$$

Similar expressions can also be derived for the bits that correspond to the imaginary axis. For example, the LLR expression for $b_{4k+2}$ can be written as:

$$LLR(b_{4k+2}) = \log \left[ \frac{\sum_{b_{4k+3},b_{4(k+p)+2},b_{4(k+p)+3} \in \{0,1\}, b_{4k+2}=0} \exp\left[\frac{2}{\sigma^2} S_I^T T(2\beta_k - |H_k|^2 T S_I)\right]}{\sum_{b_{4k+3},b_{4(k+p)+2},b_{4(k+p)+3} \in \{0,1\}, b_{4k+2}=1} \exp\left[\frac{2}{\sigma^2} S_I^T T(2\beta_k - |H_k|^2 T S_I)\right]} \right] \quad (16)$$

where $\beta_k = [\beta_1 \ \beta_2]^T = [\text{Im}(y_k) \ \text{Im}(y_{k+p})]^T$ and $S_I = \text{Im}(S_k)$. Note that the summation over $b_{4k+3}$, $b_{4(k+p)+2}$, $b_{4(k+p)+3}$ with $b_{4k-2}=0$ implies using the following vectors for $S_I$ in the summation in equation (16):

$$S_I = \frac{1}{\sqrt{10}} \left\{ \begin{bmatrix} -3 \\ +3 \end{bmatrix}, \begin{bmatrix} -3 \\ +1 \end{bmatrix}, \begin{bmatrix} -3 \\ -1 \end{bmatrix}, \begin{bmatrix} -3 \\ -3 \end{bmatrix}, \begin{bmatrix} -1 \\ +3 \end{bmatrix}, \begin{bmatrix} -1 \\ +1 \end{bmatrix}, \begin{bmatrix} -1 \\ -1 \end{bmatrix}, \begin{bmatrix} -1 \\ -3 \end{bmatrix} \right\}.$$

Further, the summation over $b_{4k+3}$, $b_{4(k+p)+2}$, $b_{4(k+p)+3}$ with $b_{4k+2}=1$ implies using the following vectors for $S_I$ in the summation in equation (16):

$$S_I = \frac{1}{\sqrt{10}} \left\{ \begin{bmatrix} +1 \\ +3 \end{bmatrix}, \begin{bmatrix} +1 \\ +1 \end{bmatrix}, \begin{bmatrix} +1 \\ -1 \end{bmatrix}, \begin{bmatrix} +1 \\ -3 \end{bmatrix}, \begin{bmatrix} +3 \\ +3 \end{bmatrix}, \begin{bmatrix} +3 \\ +1 \end{bmatrix}, \begin{bmatrix} +3 \\ -1 \end{bmatrix}, \begin{bmatrix} +3 \\ -3 \end{bmatrix} \right\}.$$

Similarly, the LLR expression for $b_{4k+3}$ can be written as:

$$LLR(b_{4k+3}) = \log \left[ \frac{\sum_{b_{4k+2},b_{4(k+p)+2},b_{4(k+p)+3} \in \{0,1\}, b_{4k+3}=0} \exp\left[\frac{2}{\sigma^2} S_I^T T(2\beta_k - |H_k|^2 T S_I)\right]}{\sum_{b_{4k+2},b_{4(k+p)+2},b_{4(k+p)+3} \in \{0,1\}, b_{4k+3}=1} \exp\left[\frac{2}{\sigma^2} S_I^T T(2\beta_k - |H_k|^2 T S_I)\right]} \right] \quad (17)$$

Note that the summation over $b_{4k+2}$, $b_{4(k+p)+2}$, $b_{4(k+p)+3}$ with $b_{4k+3}=0$ implies using the following vectors for $S_I$ in the summation in equation (17):

$$S_I = \frac{1}{\sqrt{10}} \left\{ \begin{bmatrix} -3 \\ +3 \end{bmatrix}, \begin{bmatrix} -3 \\ +1 \end{bmatrix}, \begin{bmatrix} -3 \\ -1 \end{bmatrix}, \begin{bmatrix} -3 \\ -3 \end{bmatrix}, \begin{bmatrix} +3 \\ +3 \end{bmatrix}, \begin{bmatrix} +3 \\ +1 \end{bmatrix}, \begin{bmatrix} +3 \\ -1 \end{bmatrix}, \begin{bmatrix} +3 \\ -3 \end{bmatrix} \right\}.$$

Further, the summation over $b_{4k+2}$, $b_{4(k+p)+2}$, $b_{4(k+p)+3}$ with $b_{4k+3}=1$ implies using the following vectors for $S_I$ in the summation in equation (17):

$$S_I = \frac{1}{\sqrt{10}} \left\{ \begin{bmatrix} -1 \\ +3 \end{bmatrix}, \begin{bmatrix} -1 \\ +1 \end{bmatrix}, \begin{bmatrix} -1 \\ -1 \end{bmatrix}, \begin{bmatrix} -1 \\ -3 \end{bmatrix}, \begin{bmatrix} +1 \\ +3 \end{bmatrix}, \begin{bmatrix} +1 \\ +1 \end{bmatrix}, \begin{bmatrix} +1 \\ -1 \end{bmatrix}, \begin{bmatrix} +1 \\ -3 \end{bmatrix} \right\}.$$

Similarly, the LLR expression for $b_{4(k+p)+2}$ can be written as:

$$LLR(b_{4(k+p)+2}) = \log \left[ \frac{\sum_{b_{4k+2}b_{4k+3}b_{4(k+p)+3}\in\{0,1\},b_{4(k+p)+2}=0} \exp\left[\frac{2}{\sigma^2}S_I^T T(2\beta_k - |H_k|^2 TS_I)\right]}{\sum_{b_{4k+2}b_{4k+3}b_{4(k+p)+3}\in\{0,1\},b_{4(k+p)+2}=1} \exp\left[\frac{2}{\sigma^2}S_I^T T(2\beta_k - |H_k|^2 TS_I)\right]} \right] \quad (18)$$

Note that the summation over $b_{4k+2}$, $b_{4k-3}$, $b_{4(k+p)+3}$ with $b_{4(k+p)+2}=0$ implies using the following vectors for $S_I$ in the summation in equation (18):

$$S_I = \frac{1}{\sqrt{10}}\left\{\begin{bmatrix}+3\\-3\end{bmatrix},\begin{bmatrix}+1\\-3\end{bmatrix},\begin{bmatrix}-1\\-3\end{bmatrix},\begin{bmatrix}-3\\-3\end{bmatrix},\begin{bmatrix}+3\\-1\end{bmatrix},\begin{bmatrix}+1\\-1\end{bmatrix},\begin{bmatrix}-1\\-1\end{bmatrix},\begin{bmatrix}-3\\-1\end{bmatrix}\right\}.$$

Further, the summation over $b_{4k+2}$, $b_{4k+3}$, $b_{4(k+p)+3}$ with $b_{4(k+p)+2}=1$ implies using the following vectors for $S_I$ in the summation in equation (18):

$$S_I = \frac{1}{\sqrt{10}}\left\{\begin{bmatrix}+3\\+1\end{bmatrix},\begin{bmatrix}+1\\+1\end{bmatrix},\begin{bmatrix}-1\\+1\end{bmatrix},\begin{bmatrix}-3\\+1\end{bmatrix},\begin{bmatrix}+3\\+3\end{bmatrix},\begin{bmatrix}+1\\+3\end{bmatrix},\begin{bmatrix}-1\\+3\end{bmatrix},\begin{bmatrix}-3\\+3\end{bmatrix}\right\}.$$

Similarly, the LLR expression for $b_{4(k+p)+3}$ can be written as:

$$LLR(b_{4(k+p)+3}) = \log \left[ \frac{\sum_{b_{4k+2}b_{4k+3}b_{4(k+p)+2}\in\{0,1\},b_{4(k+p)+3}=0} \exp\left[\frac{2}{\sigma^2}S_I^T T(2\beta_k - |H_k|^2 TS_I)\right]}{\sum_{b_{4k+2}b_{4k+3}b_{4(k+p)+2}\in\{0,1\},b_{4(k+p)+3}=1} \exp\left[\frac{2}{\sigma^2}S_I^T T(2\beta_k - |H_k|^2 TS_I)\right]} \right] \quad (19)$$

Note that the summation over $b_{4k+2}$, $b_{4k+3}$, $b_{4(k+p)+2}$ with $b_{4(k+p)+3}=0$ implies using the following vectors for $S_I$ in the summation in equation (19):

$$S_I = \frac{1}{\sqrt{10}}\left\{\begin{bmatrix}+3\\-3\end{bmatrix},\begin{bmatrix}+1\\-3\end{bmatrix},\begin{bmatrix}-1\\-3\end{bmatrix},\begin{bmatrix}-3\\-3\end{bmatrix},\begin{bmatrix}+3\\+3\end{bmatrix},\begin{bmatrix}+1\\+3\end{bmatrix},\begin{bmatrix}-1\\+3\end{bmatrix},\begin{bmatrix}-3\\+3\end{bmatrix}\right\}.$$

Further, the summation over $b_{4k+2}$, $b_{4k+3}$, $b_{4(k+p)+2}$ with $b_{4(k+p)+3}=1$ implies using the following vectors for $S_I$ in the summation in equation (19):

$$S_I = \frac{1}{\sqrt{10}}\left\{\begin{bmatrix}+3\\-1\end{bmatrix},\begin{bmatrix}+1\\-1\end{bmatrix},\begin{bmatrix}-1\\-1\end{bmatrix},\begin{bmatrix}-3\\-1\end{bmatrix},\begin{bmatrix}+3\\+1\end{bmatrix},\begin{bmatrix}+1\\+1\end{bmatrix},\begin{bmatrix}-1\\+1\end{bmatrix},\begin{bmatrix}-3\\+1\end{bmatrix}\right\}.$$

It is expressly understood that it is possible to simplify the equations even further by multiplying the matrices by the vectors. It is understood that this is an exact approach to the calculation of the LLR. However, approximations may be used in order to reduce the complexity, (e.g., the number of electronic gates), required to implement the exact approach. Further, although for the sake of simplicity in discussion, embodiments discussed herein have assumed the 16-QAM constellation to be normalized to unit energy, it is expressly understood that other normalizations are possible. In such embodiment(s), the $\sqrt{10}$ factor would change, and the corresponding embodiments of the LLR calculation would accordingly change.

One example of an approximation that may be used to reduce the complexity of the LLR equations is through the max-log approximation. Equation (20) can be used to express the generic format of equations (12)-(19):

$$LLR=\log[\exp(A)+\exp(B)]\approx\max[A,B] \quad (20)$$

which is valid in medium to high signal-to-noise ratio (SNR) cases. Using equation (20), expanding the matrices within equations (12)-(19), and substituting for T, the reduced complexity LLR equations can be expressed as in FIGS. 4A-4H.

Simulations have shown that the high SNR max-log approximation results in only a loss of 0.1-0.2 dB when compared to the optimal (exact) LLR values, but at a much lower implementation complexity. The equations of FIGS. 4A-4H are a preferred approach for obtaining soft information when the DCM mode is used. It is expressly understood that any transformations or simplifications of these equations are within the spirit and scope of this disclosure and the appended claims.

Although an example of both an exact and approximate methods for determining the LLR are disclosed, other techniques may be used to determine the LLR, and the present disclosure is not limited to particular formulas. Moreover, other statistical methods to determine the presence of errors, as known to one killed in the art, may be used and are within the spirit and scope of the present disclosure.

It is expressly understood that occasionally, such as when narrowband interference is present in-band, the noise variance across tones is not uniform. In such an instance, the LLR equation for $b_{4k}$ can be written as:

$$LLR(b_{4k}) = \log\left[\frac{\sum_{b_{4k+1}b_{4(k+p)}b_{4(k+p)+1}} Pr(Y_k|b_{4k}=0,b_{4k+1},b_{4(k+p)},b_{4(k+p)+1})}{\sum_{b_{4k+1}b_{4(k+p)}b_{4(k+p)+1}} Pr(Y_k|b_{4k}=1,b_{4k+1},b_{4(k+p)},b_{4(k+p)+1})}\right]$$

$$= \log\left[\frac{\sum_{b_{4k+1}b_{4(k+p)}b_{4(k+p)+1}\in\{0,1\},b_{4k}=0} \exp[-(\alpha_k-|H_k|^2 TS_R)^T W_k^{-1}|H_k|^{-2}(\alpha_k-|H_k|^2 TS_R)]}{\sum_{b_{4k+1}b_{4(k+p)}b_{4(k+p)+1}\in\{0,1\},b_{4k}=1} \exp[-(\alpha_k-|H_k|^2 TS_R)^T W_k^{-1}|H_k|^{-2}(\alpha_k-|H_k|^2 TS_R)]}\right] \quad (21)$$

where $$W_k = \begin{bmatrix} \frac{\sigma_k^2}{2} & 0 \\ 0 & \frac{\sigma_{k+p}^2}{2} \end{bmatrix}.$$

By expanding equation (21) and eliminating the terms that do not depend on $S_R$, equation (21) can be re-written as:

$$LLR(b_{4k}) = \log \left[\frac{\sum_{b_{4k+1}b_{4(k+p)}b_{4(k+p)+1} \in \{0,1\}, b_{4k}=0} \exp[S_R^T TW_k^{-1}(2\alpha_k - |H_k|^2 TS_R)]}{\sum_{b_{4k+1}b_{4(k+p)}b_{4(k+p)+1} \in \{0,1\}, b_{4k}=1} \exp[S_R^T TW_k^{-1}(2\alpha_k - |H_k|^2 TS_R)]}\right] \quad (22)$$

The LLR equations for $b_{4k+1}$, $b_{4k+2}$, $b_{4k+3}$, $b_{4(k+p)}$, $b_{4(k+p)+1}$, $b_{4(k+p)+2}$ and $b_{4(k+p)+3}$ can also be rewritten in similar fashion. It should be apparent that, in view of the teachings of the present disclosure, the corresponding equations for those bits are:

$$LLR(b_{4k+1}) = \log\left[\frac{\sum_{b_{4k}b_{4(k+p)}b_{4(k+p)+1} \in \{0,1\}, b_{4k+1}=0} \exp[S_R^T TW_k^{-1}(2\alpha_k - |H_k|^2 TS_R)]}{\sum_{b_{4k}b_{4(k+p)}b_{4(k+p)+1} \in \{0,1\}, b_{4k+1}=1} \exp[S_R^T TW_k^{-1}(2\alpha_k - |H_k|^2 TS_R)]}\right],$$

$$LLR(b_{4(k+p)}) = \log\left[\frac{\sum_{b_{4k}b_{4k+1}b_{4(k+p)+1} \in \{0,1\}, b_{4(k+p)}=0} \exp[S_R^T TW_k^{-1}(2\alpha_k - |H_k|^2 TS_R)]}{\sum_{b_{4k}b_{4k+1}b_{4(k+p)+1} \in \{0,1\}, b_{4(k+p)}=1} \exp[S_R^T TW_k^{-1}(2\alpha_k - |H_k|^2 TS_R)]}\right],$$

$$LLR(b_{4(k+p)+1}) = \log\left[\frac{\sum_{b_{4k}b_{4k+1}b_{4(k+p)} \in \{0,1\}, b_{4(k+p)+1}=0} \exp[S_R^T TW_k^{-1}(2\alpha_k - |H_k|^2 TS_R)]}{\sum_{b_{4k}b_{4k+1}b_{4(k+p)} \in \{0,1\}, b_{4(k+p)+1}=1} \exp[S_R^T TW_k^{-1}(2\alpha_k - |H_k|^2 TS_R)]}\right],$$

$$LLR(b_{4k+2}) = \log\left[\frac{\sum_{b_{4k+3}b_{4(k+p)+2}b_{4(k+p)+3} \in \{0,1\}, b_{4k+2}=0} \exp[S_I^T TW_k^{-1}(2\beta_k - |H_k|^2 TS_I)]}{\sum_{b_{4k+3}b_{4(k+p)+2}b_{4(k+p)+3} \in \{0,1\}, b_{4k+2}=1} \exp[S_I^T TW_k^{-1}(2\beta_k - |H_k|^2 TS_I)]}\right],$$

$$LLR(b_{4k+3}) = \log\left[\frac{\sum_{b_{4k+2}b_{4(k+p)+2}b_{4(k+p)+3} \in \{0,1\}, b_{4k+3}=0} \exp[S_I^T TW_k^{-1}(2\beta_k - |H_k|^2 TS_I)]}{\sum_{b_{4k+2}b_{4(k+p)+2}b_{4(k+p)+3} \in \{0,1\}, b_{4k+3}=1} \exp[S_I^T TW_k^{-1}(2\beta_k - |H_k|^2 TS_I)]}\right],$$

$$LLR(b_{4(k+p)+2}) = \log\left[\frac{\sum_{b_{4k+2}b_{4k+3}b_{4(k+p)+3} \in \{0,1\}, b_{4(k+p)+2}=0} \exp[S_I^T TW_k^{-1}(2\beta_k - |H_k|^2 TS_I)]}{\sum_{b_{4k+2}b_{4k+3}b_{4(k+p)+3} \in \{0,1\}, b_{4(k+p)+2}=1} \exp[S_I^T TW_k^{-1}(2\beta_k - |H_k|^2 TS_I)]}\right],$$

and $$LLR(b_{4(k+p)+3}) = \log\left[\frac{\sum_{b_{4k+2}b_{4k+3}b_{4(k+p)+2} \in \{0,1\}, b_{4(k+p)+3}=0} \exp[S_I^T TW_k^{-1}(2\beta_k - |H_k|^2 TS_I)]}{\sum_{b_{4k+2}b_{4k+3}b_{4(k+p)+2} \in \{0,1\}, b_{4(k+p)+3}=1} \exp[S_I^T TW_k^{-1}(2\beta_k - |H_k|^2 TS_I)]}\right].$$

Expanding the matrices within equation (22), and substituting for T, the reduced complexity LLR equations can be expressed as in FIGS. 4I-4P.

Figure 5:
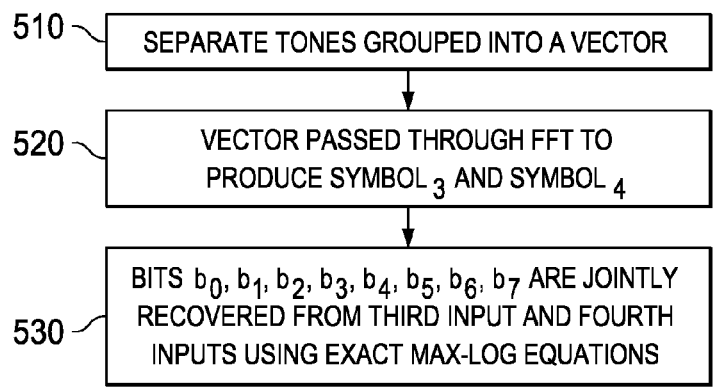
FIG. 5 illustrates an exemplary embodiment of decoding.

FIG. 5 is a flowchart of an exemplary embodiment of DCM decoding. In this example embodiment, separate tones distanced by some predetermined spacing are grouped into a vector (block 510). The vector is passed through FFT 40 to produce symbol$_3$ and symbol$_4$ (block 510). Bits $b_0$, $b_1$, $b_2$, $b_3$, $b_4$, $b_5$, $b_6$, $b_7$ are jointly recovered from third and fourth inputs using exact Max-Log equations (block 530). It should be understood that the references to $b_0$, $b_1$, $b_2$, $b_3$, $b_4$, $b_5$, $b_6$, $b_7$ herein are generic references to exemplary bits and should in no fashion be considered a limitation.

Figure 6:
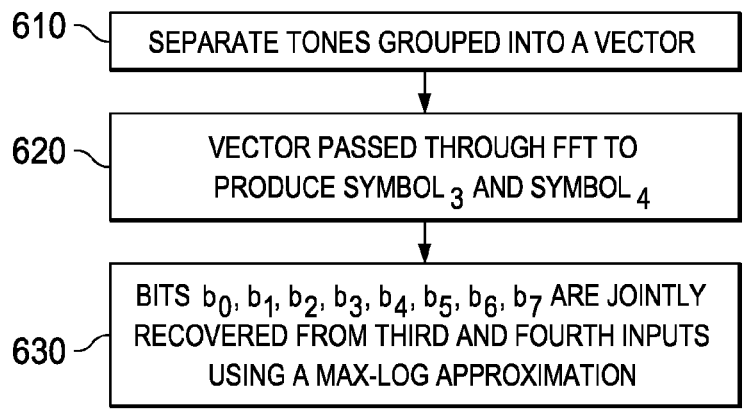
FIG. 6 illustrates an exemplary embodiment of decoding using approximation.

FIG. 6 is a flowchart of an exemplary embodiment of decoding using approximation. Blocks 610 and 620 correspond to blocks 510 and 520 of FIG. 5. However, with this embodiment, bits $b_0$, $b_1$, $b_2$, $b_3$, $b_4$, $b_5$, $b_6$, $b_7$ are jointly recovered from third and fourth inputs using a Max-Log approximation (block 630).

Figure 7:
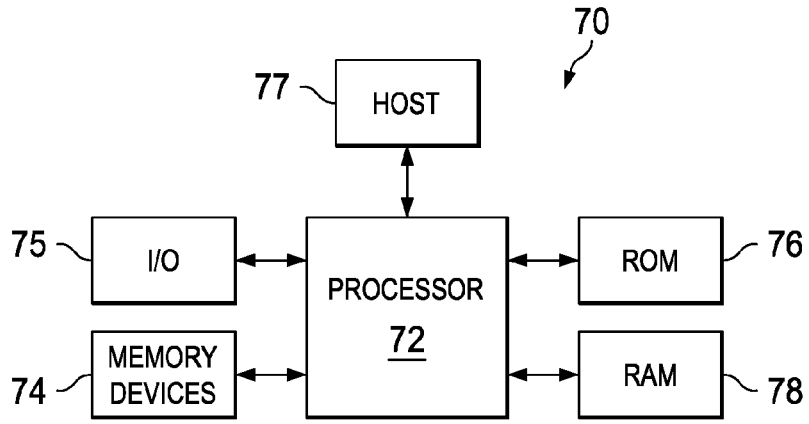
FIG. 7 illustrates an exemplary general-purpose computer system suitable for implementing the several embodiments of the disclosure.

The systems and methods described above may be implemented on any general-purpose computer with sufficient processing power, memory resources, and network throughput capability to handle the necessary workload placed upon it. FIG. 7 illustrates an exemplary, general-purpose computer system suitable for implementing one or more embodiments of a system to respond to signals as disclosed herein. Computer system 70 includes processor 72 (which may be referred to as a central processor unit or CPU) that is in communication with memory devices including secondary storage 74, read only memory (ROM) 76, random access memory (RAM) 78, input/output (I/O) 75 devices, and host 77. The processor may be implemented as one or more CPU chips.

Secondary storage 74 typically comprises one or more disk drives or tape drives and is used for non-volatile storage of data and as an over-flow data storage device if RAM 78 is not large enough to hold all working data. Secondary storage 74 may be used to store programs that are loaded into RAM 78 when such programs are selected for execution. ROM 76 is a non-volatile memory device that typically has a small memory capacity relative to the larger memory capacity of secondary storage. RAM 78 is used to store volatile data and perhaps to store instructions. Access to both ROM 76 and RAM 78 is typically faster than to secondary storage 74.

I/O devices 75 may include printers, video monitors, liquid crystal displays (LCDs), touch screen displays, keyboards, keypads, switches, dials, mice, track balls, voice recognizers, card readers, paper tape readers, or other well-known input devices. Host 77 may interface to Ethernet cards, universal serial bus (USB), token ring cards, fiber distributed data interface (FDDI) cards, wireless local area network (WLAN) cards, and other well-known network devices. Host 77 may enable processor 72 to communicate with an Internet or one or more intranets. With such a network connection, it is contemplated that processor 72 might receive information from the network, or might output information to the network in the course of performing the above-described processes.

Processor 72 executes instructions, codes, computer programs, and scripts which it accesses from hard disk, floppy disk, optical disk (these various disk based systems may all be considered secondary storage 74), ROM 76, RAM 78, or the host 77.

Figure 8:
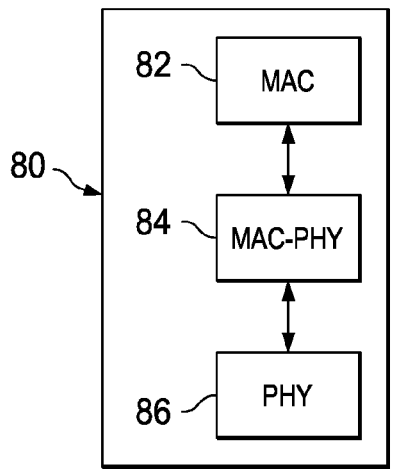
FIG. 8 illustrates an exemplary MAC, PHY, and MAC-PHY interface suitable for implementing the several embodiments of the disclosure.

The systems and methods described above may be implemented on devices with a MAC and a PHY. FIG. 8 illustrates an exemplary system 80 containing a MAC 82, a MAC-PHY interface 84, and a PHY 86. MAC 82 is capable, in this embodiment, of communicating with PHY 86 through MAC-PHY interface 84. MAC-PHY interface 84 may be a controller, processor, direct electrical connection, or any other system or method, logical or otherwise, that facilitates communication between MAC 82 and PHY 86. It is expressly understood that MAC 82, MAC-PHY interface 84, and PHY 86 may be implemented on a single electrical device, such as an integrated controller, or through the use of multiple electrical devices. It is further contemplated that MAC 82, MAC-PHY interface 84, and PHY 86 may be implemented through firmware on an embedded processor, or otherwise through software on a general purpose CPU, or may be implemented as hardware through the use of dedicated components, or a combination of the above choices. Any implementation of a device consistent with this disclosure containing a MAC and a PHY may contain a MAC-PHY interface. It is therefore expressly contemplated that the disclosed systems and methods may be used with any device with a MAC and a PHY.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A communications system, comprising:
a dual carrier modulation (DCM) decoder able to jointly decode a predetermined number of received data elements and compute a set of log-likelihood ratio (LLR) values for at least eight bits from at least one resulting transformed symbol, wherein the decoder, in computing the set of LLR values, employs a log likelihood function selected from the group of functions:

$$LLR(b_{4k}) = \log\left[\frac{\sum_{b_{4k+1}b_{4(k+p)}b_{4(k+p)+1} \in \{0,1\}, b_{4k}=0} \exp\left[\frac{2}{\sigma^2}S_R^T T(2\alpha_k - |H_k|^2 TS_R)\right]}{\sum_{b_{4k+1}b_{4(k+p)}b_{4(k+p)+1} \in \{0,1\}, b_{4k}=1} \exp\left[\frac{2}{\sigma^2}S_R^T T(2\alpha_k - |H_k|^2 TS_R)\right]}\right],$$

$$LLR(b_{4k+1}) = \log\left[\frac{\sum_{b_{4k}b_{4(k+p)}b_{4(k+p)+1} \in \{0,1\}, b_{4k+1}=0} \exp\left[\frac{2}{\sigma^2}S_R^T T(2\alpha_k - |H_k|^2 TS_R)\right]}{\sum_{b_{4k}b_{4(k+p)}b_{4(k+p)+1} \in \{0,1\}, b_{4k+1}=1} \exp\left[\frac{2}{\sigma^2}S_R^T T(2\alpha_k - |H_k|^2 TS_R)\right]}\right],$$

$$LLR(b_{(4k+p)}) = \log\left[\frac{\sum_{b_{4k}b_{4k+1}b_{4(k+p)+1} \in \{0,1\}, b_{4(k+p)}=0} \exp\left[\frac{2}{\sigma^2}S_R^T T(2\alpha_k - |H_k|^2 TS_R)\right]}{\sum_{b_{4k}b_{4k+1}b_{4(k+p)+1} \in \{0,1\}, b_{4(k+p)}=1} \exp\left[\frac{2}{\sigma^2}S_R^T T(2\alpha_k - |H_k|^2 TS_R)\right]}\right],$$

$$LLR(b_{4(k+p)+1}) = \log\left[\frac{\sum_{b_{4k}b_{4k+1}b_{4(k+p)} \in \{0,1\}, b_{4(k+p)+1}=0} \exp\left[\frac{2}{\sigma^2}S_R^T T(2\alpha_k - |H_k|^2 TS_R)\right]}{\sum_{b_{4k}b_{4k+1}b_{4(k+p)} \in \{0,1\}, b_{4(k+p)+1}=1} \exp\left[\frac{2}{\sigma^2}S_R^T T(2\alpha_k - |H_k|^2 TS_R)\right]}\right],$$

$$LLR(b_{4k+2}) = \log\left[\frac{\sum_{b_{4k+3}b_{4(k+p)+2}b_{4(k+p)+3} \in \{0,1\}, b_{4k+2}=0} \exp\left[\frac{2}{\sigma^2}S_I^T T(2\beta_k - |H_k|^2 TS_I)\right]}{\sum_{b_{4k+3}b_{4(k+p)+2}b_{4(k+p)+3} \in \{0,1\}, b_{4k+2}=1} \exp\left[\frac{2}{\sigma^2}S_I^T T(2\beta_k - |H_k|^2 TS_I)\right]}\right],$$

$$LLR(b_{4k+3}) = \log\left[\frac{\sum_{b_{4k+2}b_{4(k+p)+2}b_{4(k+p)+3} \in \{0,1\}, b_{4k+3}=0} \exp\left[\frac{2}{\sigma^2}S_I^T T(2\beta_k - |H_k|^2 TS_I)\right]}{\sum_{b_{4k+2}b_{4(k+p)+2}b_{4(k+p)+3} \in \{0,1\}, b_{4k+3}=1} \exp\left[\frac{2}{\sigma^2}S_I^T T(2\beta_k - |H_k|^2 TS_I)\right]}\right],$$

$$LLR(b_{4(k+p)+2}) = \log\left[\frac{\sum_{b_{4k+2}b_{4k+3}b_{4(k+p)+3} \in \{0,1\}, b_{4(k+p)+2}=0} \exp\left[\frac{2}{\sigma^2}S_I^T T(2\beta_k - |H_k|^2 TS_I)\right]}{\sum_{b_{4k+2}b_{4k+3}b_{4(k+p)+3} \in \{0,1\}, b_{4(k+p)+2}=1} \exp\left[\frac{2}{\sigma^2}S_I^T T(2\beta_k - |H_k|^2 TS_I)\right]}\right],$$

$$LLR(b_{4(k+p)+3}) = \log\left[\frac{\sum_{b_{4k+2}b_{4k+3}b_{4(k+p)+2} \in \{0,1\}, b_{4(k+p)+3}=0} \exp\left[\frac{2}{\sigma^2}S_I^T T(2\beta_k - |H_k|^2 TS_I)\right]}{\sum_{b_{4k+2}b_{4k+3}b_{4(k+p)+2} \in \{0,1\}, b_{4(k+p)+3}=1} \exp\left[\frac{2}{\sigma^2}S_I^T T(2\beta_k - |H_k|^2 TS_I)\right]}\right],$$

$$LLR(b_{4k}) = \log\left[\frac{\sum_{b_{4k+1}b_{4(k+p)}b_{4(k+p)+1} \in \{0,1\}, b_{4k}=0} \exp[S_R^T T W_k^{-1}(2\alpha_k - |H_k|^2 TS_R)]}{\sum_{b_{4k+1}b_{4(k+p)}b_{4(k+p)+1} \in \{0,1\}, b_{4k}=1} \exp[S_R^T T W_k^{-1}(2\alpha_k - |H_k|^2 TS_R)]}\right],$$

$$LLR(b_{4k+1}) = \log\left[\frac{\sum_{b_{4k}b_{4(k+p)}b_{4(k+p)+1} \in \{0,1\}, b_{4k+1}=0} \exp[S_R^T T W_k^{-1}(2\alpha_k - |H_k|^2 TS_R)]}{\sum_{b_{4k}b_{4(k+p)}b_{4(k+p)+1} \in \{0,1\}, b_{4k+1}=1} \exp[S_R^T T W_k^{-1}(2\alpha_k - |H_k|^2 TS_R)]}\right],$$

$$LLR(b_{4(k+p)}) = \log\left[\frac{\sum_{b_{4k}b_{4k+1}b_{4(k+p)+1} \in \{0,1\}, b_{4(k+p)}=0} \exp[S_R^T T W_k^{-1}(2\alpha_k - |H_k|^2 TS_R)]}{\sum_{b_{4k}b_{4k+1}b_{4(k+p)+1} \in \{0,1\}, b_{4(k+p)}=1} \exp[S_R^T T W_k^{-1}(2\alpha_k - |H_k|^2 TS_R)]}\right],$$

$$LLR(b_{4(k+p)+1}) = \log\left[\frac{\sum_{b_{4k}b_{4k+1}b_{4(k+p)} \in \{0,1\}, b_{4(k+p)+1}=0} \exp[S_R^T T W_k^{-1}(2\alpha_k - |H_k|^2 TS_R)]}{\sum_{b_{4k}b_{4k+1}b_{4(k+p)} \in \{0,1\}, b_{4(k+p)+1}=1} \exp[S_R^T T W_k^{-1}(2\alpha_k - |H_k|^2 TS_R)]}\right],$$

$$LLR(b_{4k+2}) = \log\left[\frac{\sum_{b_{4k+3}b_{4(k+p)+2}b_{4(k+p)+3} \in \{0,1\}, b_{4k+2}=0} \exp[S_I^T T W_k^{-1}(2\beta_k - |H_k|^2 TS_I)]}{\sum_{b_{4k+3}b_{4(k+p)+2}b_{4(k+p)+3} \in \{0,1\}, b_{4k+2}=1} \exp[S_I^T T W_k^{-1}(2\beta_k - |H_k|^2 TS_I)]}\right],$$

-continued $$LLR(b_{4k+3}) =$$

$$\log\left[\frac{\sum_{b_{4k+2}b_{4(k+p)+2}b_{4(k+p)+3}\in\{0,1\},b_{4k+3}=0} \exp[S_I^T T W_k^{-1}(2\beta_k - |H_k|^2 TS_I)]}{\sum_{b_{4k+2}b_{4(k+p)+2}b_{4(k+p)+3}\in\{0,1\},b_{4k+3}=1} \exp[S_I^T T W_k^{-1}(2\beta_k - |H_k|^2 TS_I)]}\right],$$

$$LLR(b_{4(k+p)+2}) =$$

$$\log\left[\frac{\sum_{b_{4k+2}b_{4k+3}b_{4(k+p)+3}\in\{0,1\},b_{4(k+p)+2}=0} \exp[S_I^T T W_k^{-1}(2\beta_k - |H_k|^2 TS_I)]}{\sum_{b_{4k+2}b_{4k+3}b_{4(k+p)+3}\in\{0,1\},b_{4(k+p)+2}=1} \exp[S_I^T T W_k^{-1}(2\beta_k - |H_k|^2 TS_I)]}\right],$$

and $$LLR(b_{4(k+p)+3}) =$$

$$\log\left[\frac{\sum_{b_{4k+2}b_{4k+3}b_{4(k+p)+2}\in\{0,1\},b_{4(k+p)+3}=0} \exp[S_I^T T W_k^{-1}(2\beta_k - |H_k|^2 TS_I)]}{\sum_{b_{4k+2}b_{4k+3}b_{4(k+p)+2}\in\{0,1\},b_{4(k+p)+3}=1} \exp[S_I^T T W_k^{-1}(2\beta_k - |H_k|^2 TS_I)]}\right],$$

where b is a bit, k is a selected tone, p is a non-zero integer, $$H_k = \begin{bmatrix} h_k & 0 \\ 0 & h_{k+p} \end{bmatrix} \text{ and } W_k = \begin{bmatrix} \frac{\sigma_k^2}{2} & 0 \\ 0 & \frac{\sigma_{k+p}^2}{2} \end{bmatrix}.$$

2. The system of claim 1, wherein the received data elements are tones.

3. The system of claim 1, further comprising an OFDM-based data transmission network.

4. The system of claim 1, wherein the system is an ultra-wideband system.

5. A method for communications, comprising:
joint decoding, by a dual carrier modulation (DCM) decoder, a predetermined number of received data elements; and
computing a set of log-likelihood ratio (LLR) values for at least eight bits from a resulting at least one transformed symbol, wherein the computing further comprises employing a log likelihood function selected from the group of functions:

$$LLR(b_{4k}) =$$

$$\log\left[\frac{\sum_{b_{4k+1}b_{4(k+p)}b_{4(k+p)+1}\in\{0,1\},b_{4k}=0} \exp\left[\frac{2}{\sigma^2}S_R^T T(2\alpha_k - |H_k|^2 TS_R)\right]}{\sum_{b_{4k+1}b_{4(k+p)}b_{4(k+p)+1}\in\{0,1\},b_{4k}=1} \exp\left[\frac{2}{\sigma^2}S_R^T T(2\alpha_k - |H_k|^2 TS_R)\right]}\right],$$

$$LLR(b_{4k+1}) =$$

$$\log\left[\frac{\sum_{b_{4k}b_{4(k+p)}b_{4(k+p)+1}\in\{0,1\},b_{4k+1}=0} \exp\left[\frac{2}{\sigma^2}S_R^T T(2\alpha_k - |H_k|^2 TS_R)\right]}{\sum_{b_{4k}b_{4(k+p)}b_{4(k+p)+1}\in\{0,1\},b_{4k+1}=1} \exp\left[\frac{2}{\sigma^2}S_R^T T(2\alpha_k - |H_k|^2 TS_R)\right]}\right],$$

-continued $$LLR(b_{4(k+p)}) =$$

$$\log\left[\frac{\sum_{b_{4k}b_{4k+1}b_{4(k+p)+1}\in\{0,1\},b_{4(k+p)}=0} \exp\left[\frac{2}{\sigma^2}S_R^T T(2\alpha_k - |H_k|^2 TS_R)\right]}{\sum_{b_{4k}b_{4k+1}b_{4(k+p)+1}\in\{0,1\},b_{4(k+p)}=1} \exp\left[\frac{2}{\sigma^2}S_R^T T(2\alpha_k - |H_k|^2 TS_R)\right]}\right],$$

$$LLR(b_{4(k+p)+1}) =$$

$$\log\left[\frac{\sum_{b_{4k}b_{4k+1}b_{4(k+p)}\in\{0,1\},b_{4(k+p)+1}=0} \exp\left[\frac{2}{\sigma^2}S_R^T T(2\alpha_k - |H_k|^2 TS_R)\right]}{\sum_{b_{4k}b_{4k+1}b_{4(k+p)}\in\{0,1\},b_{4(k+p)+1}=1} \exp\left[\frac{2}{\sigma^2}S_R^T T(2\alpha_k - |H_k|^2 TS_R)\right]}\right],$$

$$LLR(b_{4k+2}) =$$

$$\log\left[\frac{\sum_{b_{4k+3}b_{4(k+p)+2}b_{4(k+p)+3}\in\{0,1\},b_{4k+2}=0} \exp\left[\frac{2}{\sigma^2}S_I^T T(2\beta_k - |H_k|^2 TS_I)\right]}{\sum_{b_{4k+3}b_{4(k+p)+2}b_{4(k+p)+3}\in\{0,1\},b_{4k+2}=1} \exp\left[\frac{2}{\sigma^2}S_I^T T(2\beta_k - |H_k|^2 TS_I)\right]}\right],$$

$$LLR(b_{4k+3}) =$$

$$\log\left[\frac{\sum_{b_{4k+2}b_{4(k+p)+2}b_{4(k+p)+3}\in\{0,1\},b_{4k+3}=0} \exp\left[\frac{2}{\sigma^2}S_I^T T(2\beta_k - |H_k|^2 TS_I)\right]}{\sum_{b_{4k+2}b_{4(k+p)+2}b_{4(k+p)+3}\in\{0,1\},b_{4k+3}=1} \exp\left[\frac{2}{\sigma^2}S_I^T T(2\beta_k - |H_k|^2 TS_I)\right]}\right],$$

$$LLR(b_{4(k+p)+2}) =$$

$$\log\left[\frac{\sum_{b_{4k+2}b_{4k+3}b_{4(k+p)+3}\in\{0,1\},b_{4(k+p)+2}=0} \exp\left[\frac{2}{\sigma^2}S_I^T T(2\beta_k - |H_k|^2 TS_I)\right]}{\sum_{b_{4k+2}b_{4k+3}b_{4(k+p)+3}\in\{0,1\},b_{4(k+p)+2}=1} \exp\left[\frac{2}{\sigma^2}S_I^T T(2\beta_k - |H_k|^2 TS_I)\right]}\right],$$

$$LLR(b_{4(k+p)+3}) =$$

$$\log\left[\frac{\sum_{b_{4k+2}b_{4k+3}b_{4(k+p)+2}\in\{0,1\},b_{4(k+p)+3}=0} \exp\left[\frac{2}{\sigma^2}S_I^T T(2\beta_k - |H_k|^2 TS_I)\right]}{\sum_{b_{4k+2}b_{4k+3}b_{4(k+p)+2}\in\{0,1\},b_{4(k+p)+3}=1} \exp\left[\frac{2}{\sigma^2}S_I^T T(2\beta_k - |H_k|^2 TS_I)\right]}\right],$$

$$LLR(b_{4k}) =$$

$$\log\left[\frac{\sum_{b_{4k+1}b_{4(k+p)}b_{4(k+p)+1}\in\{0,1\},b_{4k}=0} \exp[S_R^T T W_k^{-1}(2\alpha_k - |H_k|^2 TS_R)]}{\sum_{b_{4k+1}b_{4(k+p)}b_{4(k+p)+1}\in\{0,1\},b_{4k}=1} \exp[S_R^T T W_k^{-1}(2\alpha_k - |H_k|^2 TS_R)]}\right],$$

$$LLR(b_{4k+1}) =$$

$$\log\left[\frac{\sum_{b_{4k}b_{4(k+p)}b_{4(k+p)+1}\in\{0,1\},b_{4k+1}=0} \exp[S_R^T T W_k^{-1}(2\alpha_k - |H_k|^2 TS_R)]}{\sum_{b_{4k}b_{4(k+p)}b_{4(k+p)+1}\in\{0,1\},b_{4k+1}=1} \exp[S_R^T T W_k^{-1}(2\alpha_k - |H_k|^2 TS_R)]}\right],$$

$$LLR(b_{4(k+p)}) =$$

$$\log\left[\frac{\sum_{b_{4k}b_{4k+1}b_{4(k+p)+1}\in\{0,1\},b_{4(k+p)}=0} \exp[S_R^T T W_k^{-1}(2\alpha_k - |H_k|^2 TS_R)]}{\sum_{b_{4k}b_{4k+1}b_{4(k+p)+1}\in\{0,1\},b_{4(k+p)}=1} \exp[S_R^T T W_k^{-1}(2\alpha_k - |H_k|^2 TS_R)]}\right],$$

-continued $$LLR(b_{4(k+p)+1}) = $$

$$\log\left[\frac{\sum_{b_{4k}b_{4k+1}b_{4(k+p)}\in\{0,1\},b_{4(k+p)+1}=0}\exp[S_R^T TW_k^{-1}(2\alpha_k - |H_k|^2 TS_R)]}{\sum_{b_{4k}b_{4k+1}b_{4(k+p)}\in\{0,1\},b_{4(k+p)+1}=1}\exp[S_R^T TW_k^{-1}(2\alpha_k - |H_k|^2 TS_R)]}\right],$$

$$LLR(b_{4k+2}) = $$

$$\log\left[\frac{\sum_{b_{4k+3}b_{4(k+p)+2}b_{4(k+p)+3}\in\{0,1\},b_{4k+2}=0}\exp[S_I^T TW_k^{-1}(2\beta_k - |H_k|^2 TS_I)]}{\sum_{b_{4k+3}b_{4(k+p)+2}b_{4(k+p)+3}\in\{0,1\},b_{4k+2}=1}\exp[S_I^T TW_k^{-1}(2\beta_k - |H_k|^2 TS_I)]}\right],$$

$$LLR(b_{4k+3}) = $$

$$\log\left[\frac{\sum_{b_{4k+2}b_{4(k+p)+2}b_{4(k+p)+3}\in\{0,1\},b_{4k+3}=0}\exp[S_I^T TW_k^{-1}(2\beta_k - |H_k|^2 TS_I)]}{\sum_{b_{4k+2}b_{4(k+p)+2}b_{4(k+p)+3}\in\{0,1\},b_{4k+3}=1}\exp[S_I^T TW_k^{-1}(2\beta_k - |H_k|^2 TS_I)]}\right],$$

$$LLR(b_{4(k+p)+2}) = $$

$$\log\left[\frac{\sum_{b_{4k+2}b_{4k+3}b_{4(k+p)+3}\in\{0,1\},b_{4(k+p)+2}=0}\exp[S_I^T TW_k^{-1}(2\beta_k - |H_k|^2 TS_I)]}{\sum_{b_{4k+2}b_{4k+3}b_{4(k+p)+3}\in\{0,1\},b_{4(k+p)+2}=1}\exp[S_I^T TW_k^{-1}(2\beta_k - |H_k|^2 TS_I)]}\right],$$

and $$LLR(b_{4(k+p)+3}) = $$

$$\log\left[\frac{\sum_{b_{4k+2}b_{4k+3}b_{4(k+p)+2}\in\{0,1\},b_{4(k+p)+3}=0}\exp[S_I^T TW_k^{-1}(2\beta_k - |H_k|^2 TS_I)]}{\sum_{b_{4k+2}b_{4k+3}b_{4(k+p)+2}\in\{0,1\},b_{4(k+p)+3}=1}\exp[S_I^T TW_k^{-1}(2\beta_k - |H_k|^2 TS_I)]}\right],$$

where b is a bit, k is a selected tone, p is a non-zero integer, $$H_k = \begin{bmatrix} h_k & 0 \\ 0 & h_{k+p} \end{bmatrix} \text{ and } W_k = \begin{bmatrix} \frac{\sigma_k^2}{2} & 0 \\ 0 & \frac{\sigma_{k+p}^2}{2} \end{bmatrix}.$$

6. The method of claim 5, wherein the joint decoding further comprises joint decoding a predetermined number of received data elements transmitted across an ultra-wideband system.

* * * * *